(12) United States Patent
Chen et al.

(10) Patent No.: US 7,362,191 B2
(45) Date of Patent: Apr. 22, 2008

(54) METHODS AND CIRCUITS FOR FREQUENCY MODULATION THAT REDUCE THE SPECTRAL NOISE OF SWITCHING REGULATORS

(75) Inventors: Yuhui Chen, Fremont, CA (US); Doug LaPorte, San Jose, CA (US); Randy Guy Flatness, Los Gatos, CA (US); Robert C. Dobkin, Monte Sereno, CA (US)

(73) Assignee: Linear Technology Corporation, Milpitas, CA (US)

( * ) Notice: Subject to any disclaimer, the term of this patent is extended or adjusted under 35 U.S.C. 154(b) by 958 days.

(21) Appl. No.: 10/835,693

(22) Filed: Apr. 29, 2004

(65) Prior Publication Data
US 2005/0243894 A1 Nov. 3, 2005

(51) Int. Cl.
*H03B 29/00* (2006.01)
*H02M 7/00* (2006.01)

(52) U.S. Cl. .......................................... 331/78; 363/13

(58) Field of Classification Search ................. 331/78; 323/234, 299, 304, 318; 363/13
See application file for complete search history.

(56) References Cited

U.S. PATENT DOCUMENTS

| 5,488,627 A | 1/1996 | Hardin et al. | |
| 5,929,620 A | 7/1999 | Dobkin et al. | |
| 2005/0243894 A1* | 11/2005 | Chen et al. | 375/139 |

OTHER PUBLICATIONS

Hardin, K., Fessler, J. and Bush, D., "Spread Spectrum Clock Generation for the Reduction of Radiated Emissions", 1994 IEEE International Symposium on Electromagnetic Compatibility, pp. 227-231 (Aug. 22-26, 1994).
Lin, F. and Chen, D.Y., "Reduction of Power Supply EMI Emission by Switching Frequency Modulation", IEEE Transactions on Power Electronics, pp. 132-137 (Jan. 1994).
Linear Technology, "LTC1735 High Efficiency Synchronous Step-Down Switching Regulator", Datasheet (1998).
Linear Technology, "LTC3251/LTC3251-1.2/LTC3251-1.5 500mA High Efficiency, Low Noise, Inductorless Step-Down DC/DC Converter", Datasheet (2003).
Linear Technology, "LTC6902 Multiphase Oscillator with Spread Spectrum Frequency Modulation", Datasheet (2003).
Seago, J., "LTC1436-PLL Low Noise Switching Regulator Helps Control EMI", Linear Technology Design Note 141 (1996).
Stone, D., Chambers, B. and Howe, D., "Random Carrier Frequency Modulation of PWM Waveforms to Ease EMC Problems in Switched Mode Power Supplies", Proceedings of IEEE Power Electronics and Drive Systems Conference, pp. 16-21 (1995).
Yang, K., "Spread-Spectrum DC—DC Converter Combats EMI", Electronic Design Magazine, pp. 86, 88. (Nov. 5, 2001).

* cited by examiner

*Primary Examiner*—David Mis
(74) *Attorney, Agent, or Firm*—McDermott Will & Emery LLP

(57) ABSTRACT

The present invention comprises methods and circuits for spread spectrum frequency modulation that reduce peak spectral noise at the outputs or inputs of switching regulators. More specifically, the present invention modulates the operating frequency of the switching regulator in accordance with a frequency modulation waveform having a shape coordinated to a peak noise amplitude waveform that describes the correlation between the operating frequency of a switching regulator and the peak noise amplitude at the regulator's input or output absent spread spectrum frequency modulation.

39 Claims, 22 Drawing Sheets

METHODS AND CIRCUITS FOR FREQUENCY MODULATION THAT REDUCE THE SPECTRAL NOISE OF SWITCHING REGULATORS

FIELD OF THE INVENTION

The present invention relates to methods and circuits for spread spectrum frequency modulation that reduce the peak spectral noise of switching regulators.

BACKGROUND OF THE INVENTION

Switching regulators regulate voltage across a load connected to its output by varying the ON-OFF times of switching elements so that power is transmitted through the switching elements into energy storage elements. The energy storage elements then supply this power to the load. Switching regulators vary the ON-OFF times of the switching elements, in part, responsive to a clock signal generated by an oscillator. In a manner to be discussed in greater detail hereinbelow, the noise at the output of the switching regulator is dependent on the switching frequency of the clock signal, which hereinafter also will be referred to as the operating frequency of the switching regulator.

A switching regulator introduces electromagnetic noise to an electronic application. While various techniques can be used in reducing the radiated and common-mode noise, differential-mode noise can be neither shielded nor snubbed. Instead, it directly is passed along the power distribution path. A typical fixed frequency switching regulator has a differential-mode noise spectrum as shown in FIG. 1, with high peaks of undesirable energy concentrated at the switching frequency ($f_S$) and its harmonics.

In general, two kinds of techniques are available in reducing the differential-mode noise: filtering and spectrum spreading. Filtering attenuates noise by adding additional components, which either have to conduct full supply current or support full supply voltage. To accommodate such high power transmission, those additional components can be physically large. In contrast, spectrum spreading deals with the noise problem from the clock source. Without the use of additional power components to conduct high power, spectrum spreading modulates the instantaneous operating frequency of a switching regulator over a span of switching frequencies, attenuating the peak noise amplitude by distributing the energy across the span of switching frequencies. This reduces the conducted interference of the switching regulator with its downstream devices, often resulting in better noise reduction than filtering.

There have been different methods for spectrum spreading to reduce differential-mode noise. Depending on how the switching frequency is modulated over time, those existing methods can be sorted into two major categories of frequency modulation: sinusoidal and linear frequency modulation.

Early research on frequency modulation for switching-mode power supplies used sinusoidal modulation, in which the operating frequency is modulated in accordance with a sinusoidal frequency modulation waveform (see, e.g., FIG. 2A). Sinusoidal frequency modulation may include (1) sequential sinusoidal frequency modulation in which the switching frequency increases and decreases with time along a smooth or step-wise continuous sinusoidal curve, and (2) pseudo-random sinusoidal frequency modulation in which the switching frequency "hops" among different frequencies in a pseudo-random fashion in which the values of the switching frequencies over a period of time, if sorted in numerical order, form approximately a sinusoidal curve. Since the time derivative of a sinusoidal waveform is greatest at its middle points but equals zero at the peaks and valleys (which correspond to the maximum and minimum frequencies, respectively), the resulting noise spectrum has peaks or "horns" at the frequency extremes, thereby affecting the efficiency of noise reduction. When the frequency of a switching regulator is modulated in accordance with a sinusoidal frequency modulation waveform, the resulting differential-mode noise spectrum across the output capacitor of a switching regulator illustratively is depicted in FIG. 2B.

Linear frequency modulation modulates the switching frequency in accordance with a linear frequency modulation waveform such as by (1) sequential linear frequency modulation in which the switching frequency increases and decreases with time along a smooth or step-wise continuous linear curve, and (2) pseudo-random linear frequency modulation in which the switching frequency "hops" among different frequencies in a pseudo-random fashion in which the values of the switching frequencies over a period of time, if sorted in numerical order, form a straight line between the minimum and maximum switching frequencies. Although linear frequency modulation yields better noise reduction than the sinusoidal method, it still suffers from higher noise amplitudes (or "horns") at frequency extremes. See, e.g., FIGS. 2C-D, which respectively provide an illustrative linear frequency modulation waveform and the resulting differential-mode noise spectrum across the output capacitor of a switching regulator when the regulator's switching frequency is modulated in accordance with a linear frequency modulation waveform.

U.S. Pat. No. 5,488,627 to Hardin et al. ("the Hardin patent") and "Spread Spectrum Clock Generation for the Reduction of Radiated Emissions" by Hardin et al., Proceedings of IEEE EMC Conference (1994) ("the Hardin article") describe a third frequency modulation waveform ("the Hardin frequency modulation waveform") that was developed mainly to reduce radiated noise, rather than differential-mode noise. However, when the frequency of a switching regulator is modulated in accordance with a waveform similar to the Hardin modulation waveform, the "horns" in the differential-mode noise amplitude at the frequency extremes also is reduced.

FIG. 2E depicts the Hardin frequency modulation waveform (as provided in the Hardin article). When the switching frequency is modulated in accordance with the Hardin frequency modulation waveform, the illustrative radiated noise spectrum shown in FIG. 2F (as provided in the Hardin article) may be generated at the output of a clock that outputs a simple periodic rectangular waveform with a constant amplitude. In contrast, FIG. 3 provides an illustrative differential-mode noise spectrum generated at the output of a switching regulator when its switching frequency is modulated in accordance with a waveform similar to the Hardin frequency modulation waveform. FIG. 3 shows that a waveform similar to the Hardin modulation waveform reduces the "horns" in the differential-mode noise spectrum and may reduce the maximum noise amplitude as compared to that resulting from fixed frequency operation, linear frequency modulation, and sinusoidal frequency modulation. The illustrative noise spectra provided in FIGS. 2B, 2D and 3 are generated using the same power converter.

Unlike the radiated noise spectra shown in FIG. 2F at the output of a clock that generates a simple periodic rectangular waveform having a constant amplitude, the differential-mode noise spectrum at the output of a switching regulator develops a tilted spectral envelope when any of the above-described modulation waveforms are employed in spread spectrum frequency modulation. For example, as illustrated in FIG. 3, the differential-mode noise spectrum across the output capacitor of a switching regulator when the switching frequency is modulated in accordance with a waveform similar to the Hardin frequency modulation waveform disadvantageously tilts from the minimum switching frequency toward the maximum switching frequency at the top of spectral envelope 15 (i.e., spectral ceiling 17).

In view of the foregoing, it would be desirable to be able to provide methods and circuits for spread spectrum frequency modulation that reduce the maximum noise amplitude at the output of a switching regulator by reducing, if not eliminating, the tilt of the spectral noise envelope.

It also would be desirable to be able to provide methods and circuits for spread spectrum frequency modulation that reduce the maximum noise amplitude at the output of a switching regulator by reducing, if not eliminating, the "horns" at the extremes of the frequency modulation span.

SUMMARY OF THE INVENTION

In view of the foregoing, it is an object of the present invention to provide methods and circuits for spread spectrum frequency modulation that reduce the maximum noise amplitude at the input or output of a switching regulator by reducing, if not eliminating, the tilt of the spectral noise envelope.

It also is an object of the present invention to provide methods and circuits for spread spectrum frequency modulation that reduce the maximum noise amplitude at the input or output of a switching regulator by reducing, if not eliminating, the "horns" at the extremes of the frequency modulation span.

It further is an object of the present invention to provide methods and circuits that permit a user to disable spread spectrum frequency modulation in favor of fixed frequency operation or synchronization of the clock signal of the switching regulator with an external clock signal.

These and other objects of the present invention are accomplished by frequency modulation circuits configured to generate a clock signal having a varying frequency that is modulated in accordance with the frequency modulation waveforms of the present invention. The shape of each frequency modulation waveform of the present invention is coordinated to a peak noise amplitude waveform that correlates the switching frequency of the switching regulator with the corresponding peak noise amplitude at the regulator's input or output absent spread spectrum frequency modulation. The peak noise amplitude waveform varies from application to application and may be determined empirically or by theoretical derivation.

The frequency modulation circuits of the present invention comprise a signal generator coupled to an oscillator that generates a clock signal responsive to a varying voltage or current signal output by the signal generator. In one embodiment, the signal generator is configured to supply an oscillator having a linear input-to-output transfer characteristic with a signal waveform having magnitudes over a period of time that, if sorted in increasing numerical order, form a curve that approximates the shape of the frequency modulation waveforms of the present invention.

Alternatively, the oscillator is configured with a non-linear input-to-output transfer function that approximates the frequency modulation waveforms of the present invention.

To provide greater flexibility to a user, the user may disable spread spectrum frequency operation and direct the oscillator to generate the clock signal responsive to an alternative signal source associated with fixed frequency operation or synchronization with an external clock signal.

BRIEF DESCRIPTION OF THE DRAWINGS

Further features of the present invention, its nature and various advantages will be more apparent from the accompanying drawings and the following detailed description, in which.

DETAILED DESCRIPTION OF THE DRAWINGS

Figure 3:
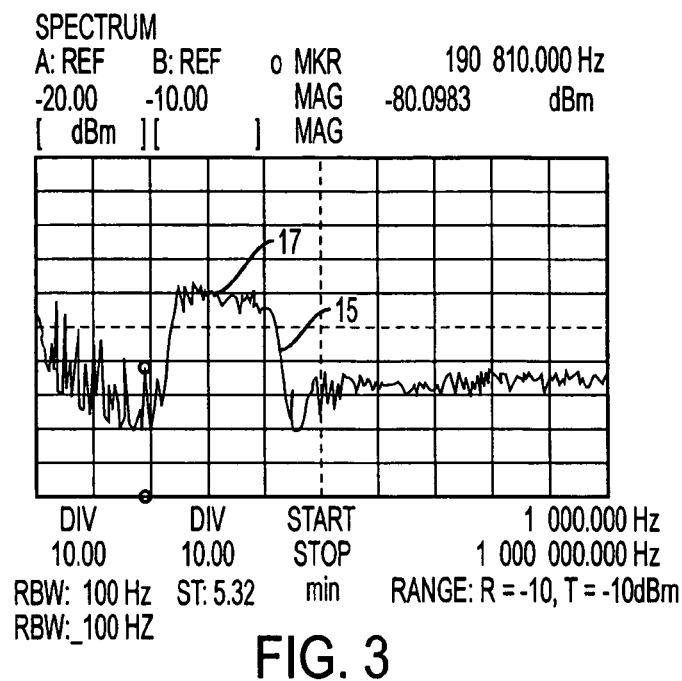
FIG. 3 is an illustrative graph of the differential-mode noise spectrum across the output capacitor of a switching regulator when the operating frequency of the switching regulator is modulated in accordance with a waveform similar to the Hardin frequency modulation waveform.

In a switching regulator, the tilt in the noise spectrum at the output of the regulator, as illustrated in FIG. 3, results from the dependence of the inductor current and output voltage on the regulator's switching frequency. For example, in a buck regulator, the inductor current ripple ($\Delta I_L$) and output voltage ripple ($\Delta V_{OUT}$) are inversely proportional to the switching frequency ($f_S$) in the following manner:

$$\Delta I_L = \frac{K_1}{f_S} \qquad \text{EQ. 1}$$

$$K_1 = \frac{V_{OUT} * \left(1 - \frac{V_{OUT}}{V_{IN}}\right)}{2L} \qquad \text{EQ. 2}$$

where $V_{IN}$ is the regulator's input voltage, and L is the inductance of the regulator's inductor.

Output ripple voltage $\Delta V_{OUT}$ is:

$$\Delta V_{OUT} = \frac{1}{C_{OUT}} * \left(\int_0^{D*T} \Delta i_L dt\right) + ESR * \Delta I_L + ESL * \frac{d(\Delta i_L)}{dt} \qquad \text{EQ. 3A}$$

where $C_{OUT}$ is the capacitance of the output capacitor, ESR is the equivalent series resistance of the output capacitor, and ESL is the equivalent series inductance of the output capacitor. Assuming ESL is negligible and the frequency component of inductor current ripple $\Delta I_L$ primarily is the switching frequency ($f_S$), output ripple voltage $\Delta V_{OUT}$ can be approximated as:

$$\Delta V_{OUT} \approx \Delta I_L * \sqrt{ESR^2 + \left(\frac{1}{2\pi * f_S * C_{OUT}}\right)^2} \qquad \text{EQ. 3B}$$

For an engineering estimation, EQ. 3B further can be simplified to:

$$\Delta V_{OUT} \approx \Delta I_L * \left(ESR + \frac{1}{8 f_S C_{OUT}}\right) \qquad \text{EQ. 3C}$$

Similar equations for inductor current ripple and output voltage ripple may be derived for regulators of different topologies, e.g., boost, buck-boost, SEPIC, etc.

The amplitude of a noise signal across the output capacitor of any switching regulator may be measured in terms of power by a spectrum analyzer that works as a swept-tuned superheterodyne receiver. To determine the power of peak noise amplitude $A_0$ at the output of any switching regulator, a spectrum analyzer may be used for direct measurement or the following equation may provide an approximation:

$$A_0 = 10 * lg\left(\frac{\Delta V^2}{R_{TERM} * 1 \text{ mW}}\right) \qquad \text{EQ. 4}$$

where the units of peak noise amplitude $A_0$ is "dBm" and $R_{TERM}$ is the termination resistor of the spectrum analyzer, which typically is 50Ω.

Figure 4:
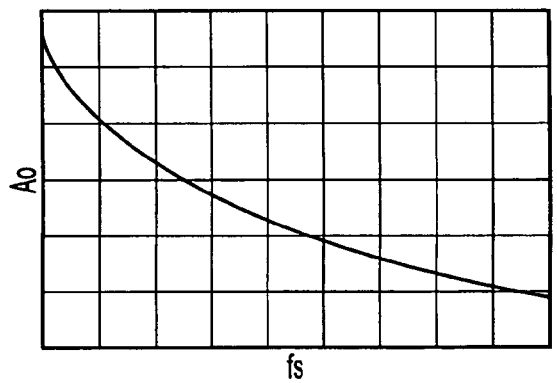
FIG. 4 depicts an illustrative peak noise amplitude waveform that correlates the operating frequencies of a switching regulator and the corresponding peak noise amplitude across the regulator's output capacitor absent spread spectrum frequency modulation.

FIG. 4 provides an illustrative graph of peak noise amplitude $A_0$ across the output capacitor of a switching buck regulator as a function of the regulator's operating frequency absent spread spectrum frequency modulation. As used herein, this waveform is referred to as a peak noise amplitude waveform. Peak noise amplitude waveforms having shapes similar to that of FIG. 4 also may be generated for switching regulators of other topologies, e.g., boost, buck-boost, SEPIC, etc. Accordingly, although the peak noise amplitude waveform of FIG. 4 illustrates the peak noise at the output of a buck regulator, that waveform also provides an illustrative approximation of the peak noise amplitude waveform for any switching regulator topology or application. Closer approximations of the peak noise amplitude waveforms for specific regulator topologies and applications may be obtained by empirical measurement or by theoretical derivation.

Figure 1:
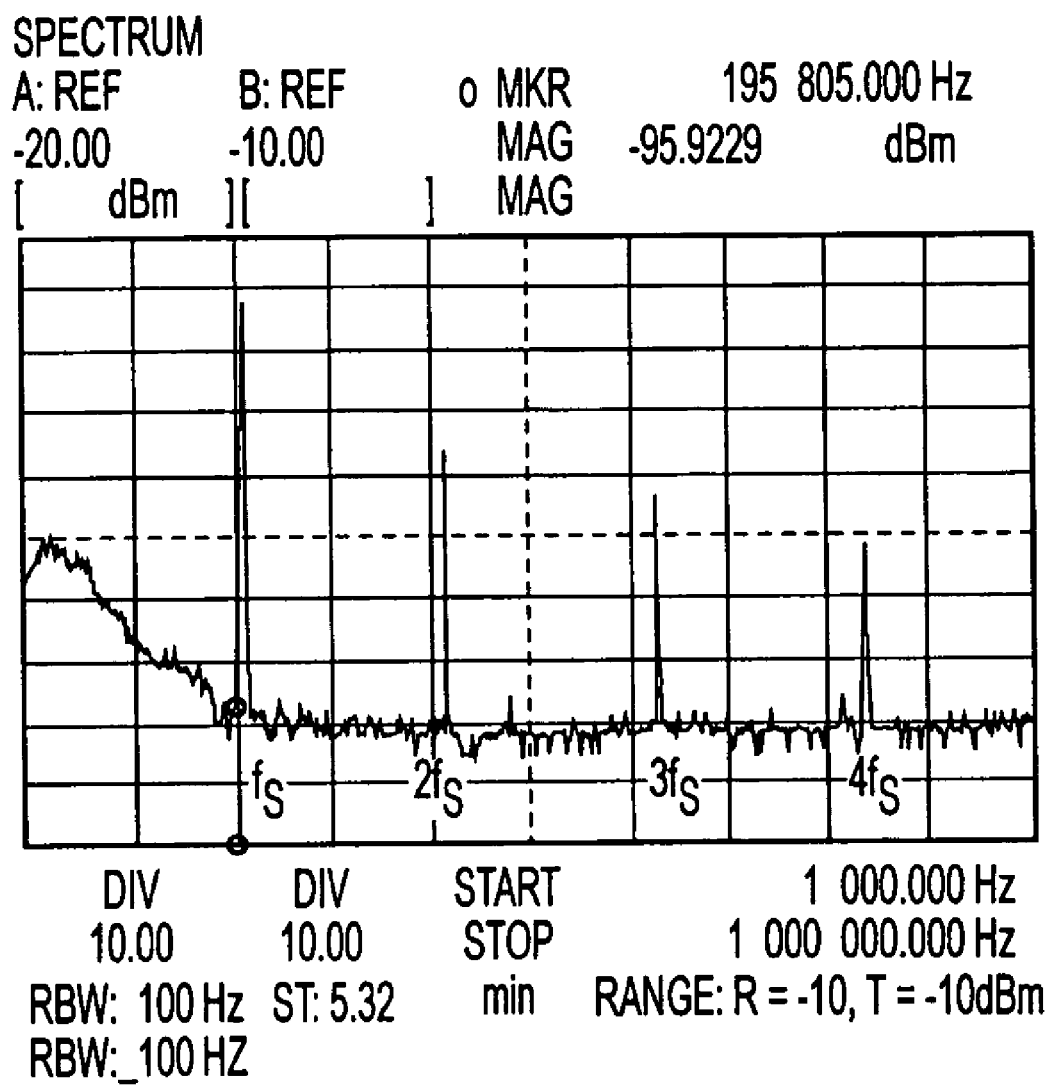
FIG. 1 is an illustrative noise spectrum across the output capacitor of a switching regulator absent spread spectrum frequency modulation.
Figure 2A:
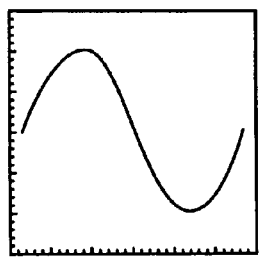
FIGS. 2A-B respectively are illustrative graphs of a sinusoidal frequency modulation waveform and the resulting differential-mode noise spectrum across the output capacitor of a switching regulator when the switching frequency is modulated in accordance with the sinusoidal frequency modulation waveform.
Figure 2B:
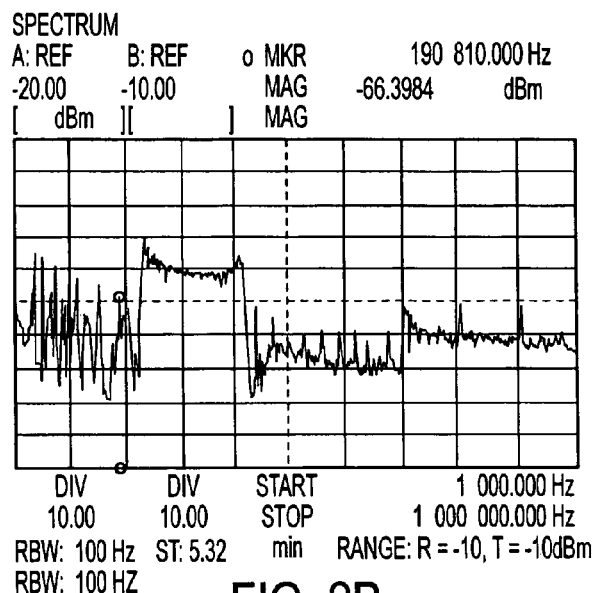
Figure 2C:
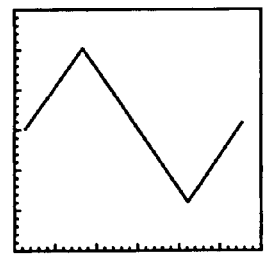
FIGS. 2C-D respectively are illustrative graphs of a linear frequency modulation waveform and the resulting differential-mode noise spectrum across the output capacitor of a switching regulator when the switching frequency is modulated in accordance with the linear frequency modulation waveform.
Figure 2D:
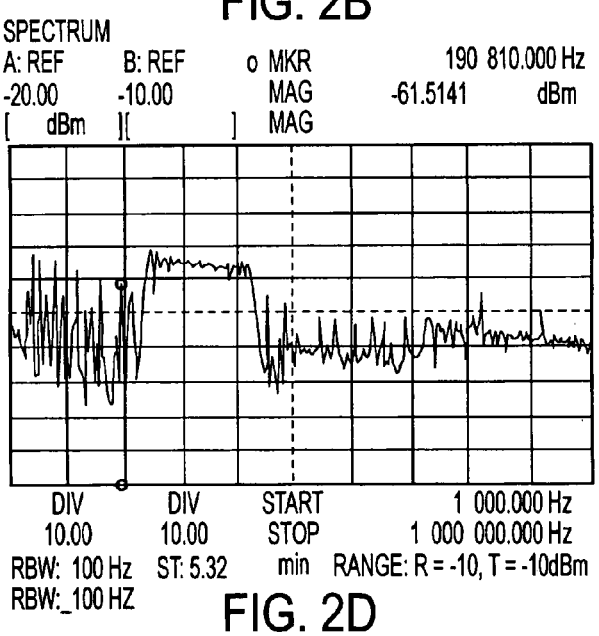
Figure 2E:
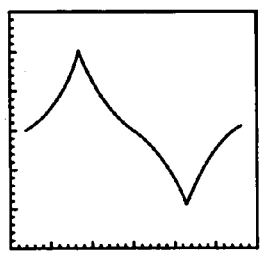
FIGS. 2E-F respectively are illustrative graphs of the Hardin frequency modulation waveform and the resulting radiated noise spectrum at the output of a clock that outputs a simple periodic rectangular waveform with a constant amplitude when the clock frequency is modulated in accordance with the Hardin modulation waveform.
Figure 2F:
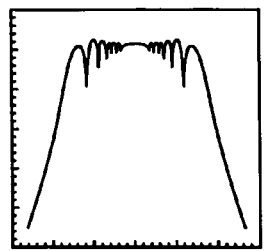

FIG. 4 indicates that the noise amplitude across a switching regulator's output capacitor non-linearly increases with decreasing operating frequency. This causes the spectral noise envelope at the regulator's output to tilt when the operating frequency of the switching regulator is modulated in accordance with a modulation waveform similar to that described with respect to FIG. 2A, 2C, or 2E since those modulation waveforms do not compensate for this correlation between maximum noise amplitude and operating frequency.

According to the principles of the present invention, the tilt to the spectral noise envelope at the output of a switching regulator is reduced, if not eliminated, by modulating the operating frequency of a switching regulator in accordance with a frequency modulation waveform that is coordinated to the peak noise amplitude waveform of the switching regulator application. As used herein, the frequency modulation waveform of the present invention is coordinated to the peak noise amplitude waveform of a switching regulator application when the modulation waveform has a shape that at least in part compensates for the shape of the peak noise amplitude waveform. Such compensation reduces the tilt and, preferably, also reduces the "horns" at the extreme switching frequencies.

Figure 5:
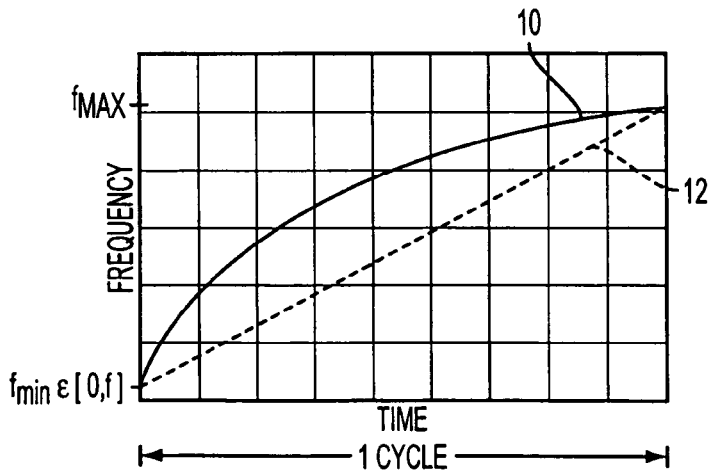
FIG. 5 depicts an illustrative first embodiment of the frequency modulation waveforms of the present invention juxtaposed with a linear frequency modulation waveform.
Figure 6A:
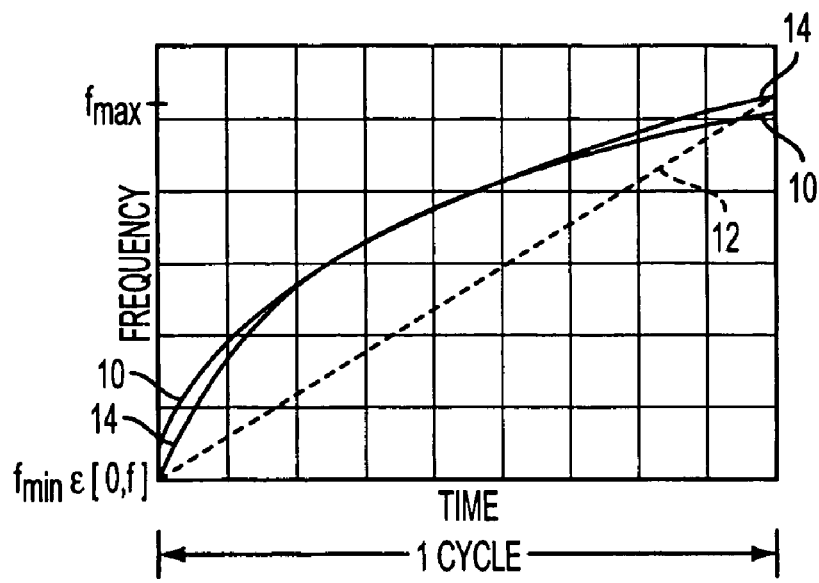
FIG. 6A depicts an illustrative second embodiment of the frequency modulation waveforms of the present invention juxtaposed with the waveforms of FIG. 5.

A first illustrative frequency modulation waveform of the present invention is provided in FIG. 5, juxtaposed with linear frequency modulation waveform 12. Illustrative frequency modulation waveform 10 of the present invention has a shape that is similar to the horizontal mirror of the peak noise amplitude waveform of FIG. 4. To further compensate for the "horns" at the extreme switching frequencies, the slopes at the frequency extremes of frequency modulation waveform 10 are increased slightly, forming second illustrative frequency modulation waveform 14 of the present invention, as shown in FIG. 6A. FIG. 6A juxtaposes second illustrative frequency modulation waveform 14 with first illustrative waveform 10 and linear modulation waveform 12.

Figure 6B:
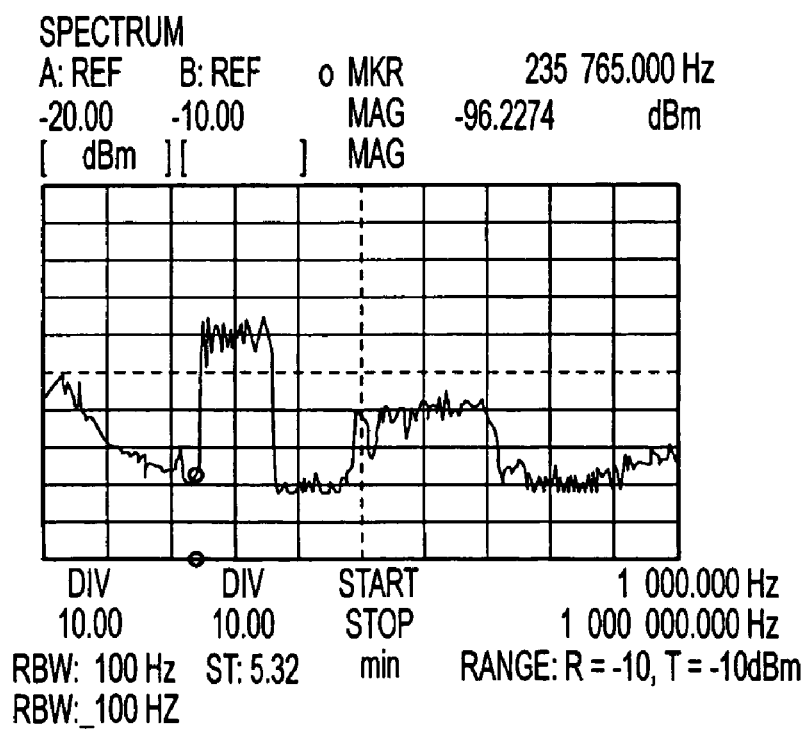
FIG. 6B is an illustrative graph of the noise spectrum across the output capacitor of a switching regulator when the operating frequency of the switching regulator is modulated in accordance with the second embodiment of the frequency modulation waveforms of the present invention shown in FIG. 6A.

FIG. 6B depicts the noise spectrum across the output capacitor of a switching regulator in which the operating frequency is modulated in accordance with waveform 14. Modulation waveform 14 substantially eliminates the tilt of spectral ceiling 17. Waveform 14 also reduces the "horns" in the noise spectrum at the frequency extremes of the frequency modulation range that otherwise would exist if a switching regulator is modulated in accordance with a sinusoidal or linear frequency modulation waveform. Waveform 14 also reduces the maximum magnitude of the peak noise signal from that generated when the same switching regulator is modulated in accordance with waveforms similar to linear, sinusoidal or Hardin modulation waveforms.

Figure 6C:
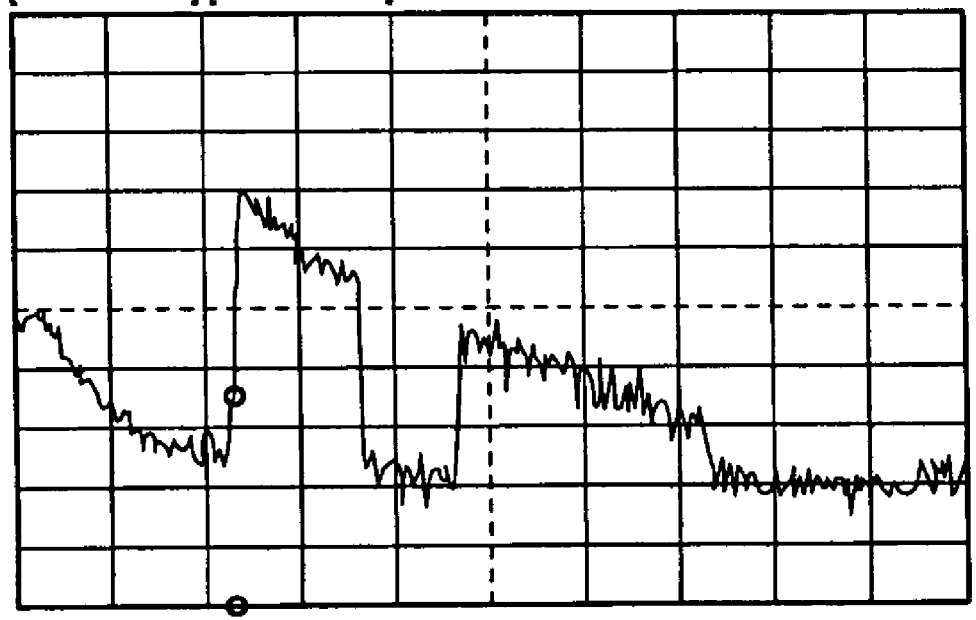
FIG. 6C is a second illustrative graph of the noise spectrum across the output capacitor of a switching regulator when the operating frequency of the switching regulator is modulated in accordance with a linear frequency modulation waveform.

The noise spectrum shown in FIG. 6B was generated with a power converter different than that used to generate the noise spectrum shown in FIG. 3. If the same switching regulator is used, the maximum peak noise amplitude corresponding to the frequency modulation waveforms of the present invention typically will be less than that corresponding to waveforms similar to the modulation waveforms illustrated in FIGS. 2A, 2C and 2E. For example, FIG. 6C shows a noise spectrum that was generated using the same power converter as that used to generate the noise spectrum of FIG. 6B, but modulated in accordance with a linear frequency modulation waveform instead of a frequency modulation waveform of the present invention. FIG. 6C shows that the maximum peak noise amplitude across the output capacitor of a switching regulator that is modulated in accordance with a linear frequency modulation waveform is greater than that resulting from modulation in accordance with a frequency modulation waveform of the present invention. Advantageously, not only are the frequency modulation waveforms of the present invention effective in reducing the differential-mode conducted noise, the waveforms also may reduce radiated noise from the level experienced when the switching frequency of the regulator is fixed.

An exact mathematical description of waveform 14 is difficult (if not impossible) to define. The spectrum of an output signal from a switching regulator is determined by the shape of the signal's waveform (which depends on the regulator's input and output voltages), the regulator topology, and the type of capacitors disposed at the output. Since the shape of the output waveform of a switching regulator typically resembles a union of a triangular waveform and its integral waveform with small steps due to the equivalent series inductance, and thus rarely is symmetrical or uniform, analytical derivation is even more difficult. For engineering practice, however, waveforms 10 and 14 of FIG. 6A may be approximated by the following logarithmic or exponential functions:

$$f_S = f_{A1} + K_2 \ln(t), t \in [T_1, T_2] \quad \text{EQ. 5A}$$

$$f_S = f_{A2} - K_3 e^{-\frac{t}{\tau}} \quad \text{EQ. 5B}$$

where $K_2$ and $K_3$ are constants dependent on the switching regulator topology and application, and $f_{A1}$ and $f_{A2}$ are base frequencies that are application specific. More specifically, $f_{A1}$ and $f_{A2}$ are constant operating frequencies if spread spectrum modulation is disabled. Constants $K_2$ and $K_3$ also may be varied to account for other design issues.

Alternatively, modulation waveforms 10 and 14 also may be approximated by the following square root and inversion functions (respectively):

$$f_S = f_{MIN} + \sqrt{K_4 T}, t \in [T_1, T_2] \quad \text{EQ. 6}$$

$$f_S = f_{MAX} - \frac{K_5}{t + K_6}, t \in [T_1, T_2] \quad \text{EQ. 7}$$

where $f_{MIN}$ and $f_{MAX}$ are constant base frequencies at which the switching regulator would operate if spread spectrum frequency modulation is disabled. $K_4$, $K_5$ and $K_6$ are constants dependent on the switching regulator topology and application, and may be varied to account for other design issues.

The frequency modulation waveforms of the present invention are not limited to the approximations expressed above. Common to those approximations is that the second derivative of those waveforms with respect to time (i.e., $d^2f_S/dt^2$) is negative in the range of switching frequencies of interest. One of ordinary skill in the art will recognize that other waveforms similarly characterized also may be used without departing from the scope of the present invention. For example, the frequency modulation waveform of the present invention may be approximated by a waveform in which the following conditions are met:

$$y = 0 \mid_{x=0} \qquad \text{EQ. 8}$$

$$y = 100\% \mid_{x=100\%} \qquad \text{EQ. 9}$$

$$\frac{dy}{dx} > 0 \qquad \text{EQ. 10}$$

$$\frac{d^2y}{dx^2} < 0 \qquad \text{EQ. 11}$$

where x and y are defined by the following equations:

$$y = \frac{f_s - F_{MIN}}{F_{MAX} - F_{MIN}} * 100\% \qquad \text{EQ. 12}$$

$$x = \frac{t}{T_{CYCLE}} * 100\%, t \in [0, T_{CYCLE}] \qquad \text{EQ. 13}$$

where $f_S$ is the switching frequency, $F_{MIN}$ is the minimum switching frequency in the frequency range over which the clock signal is varied, $F_{MAX}$ is the maximum switching frequency in the frequency range, $T_{CYCLE}$ is the period of one cycle of the frequency modulation waveform, and t is the time associated with a corresponding switching frequency ($f_S$) within each cycle of the frequency modulation waveform.

Figure 7A:
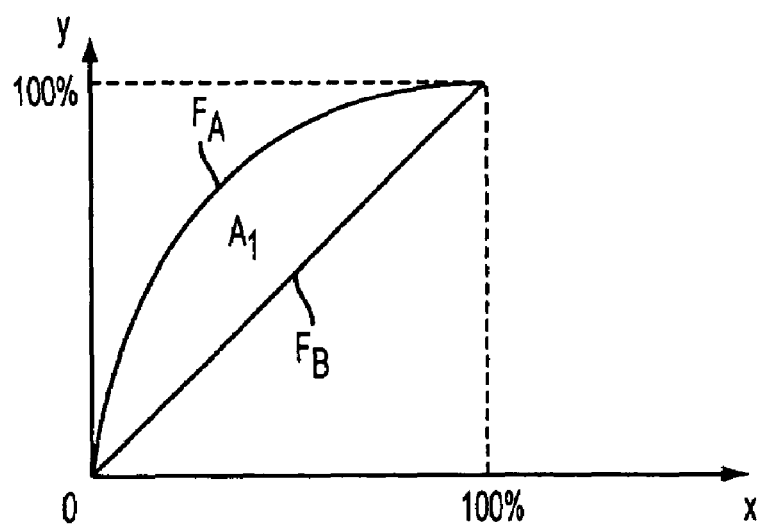
FIG. 7A is an illustrative graph of an area within which a third embodiment of the frequency modulations waveforms of the present invention reside.

As illustrated in FIG. 7A, asymptotes $F_A$ and $F_B$ define area $A_1$ within which most, if not all, the frequency modulation waveforms of the present invention reside:

$$F_A: y=\sqrt{-x^2+2x}, x \in [0,1] \qquad \text{EQ. 14}$$

$$F_B: y=x \qquad \text{EQ. 15}$$

Although asymptote $F_A$ does not satisfy the conditions expressed by EQS. 10-11 at x=0 and x=1, the frequency modulation waveforms of the present invention also may be approximated by EQ. 14, which defines a quadrant of a circle. The frequency modulation waveforms of the present invention may not, however, be approximated by EQ. 15, which defines a straight line.

Figure 7B:
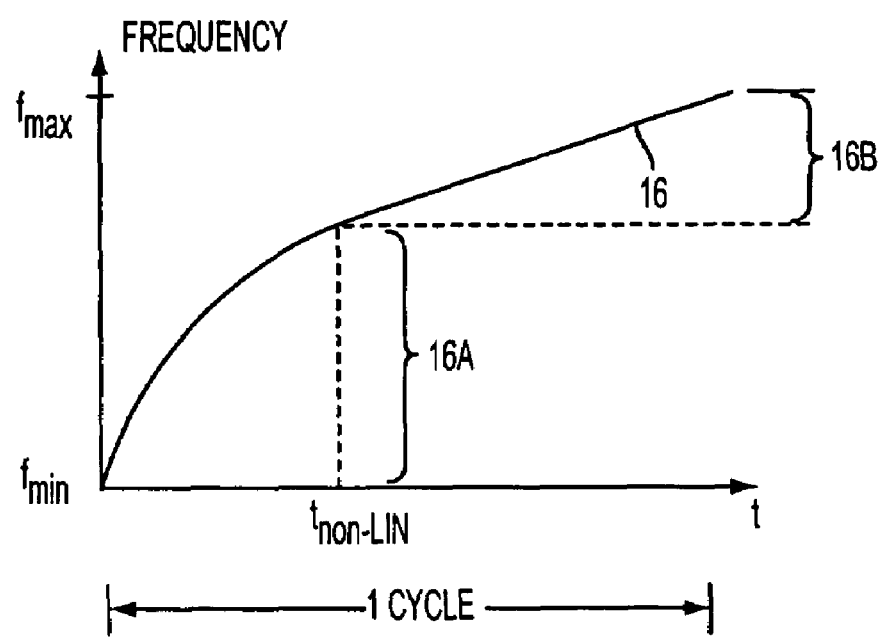
FIG. 7B illustrates a fourth embodiment of the frequency modulation waveforms of the present invention having non-linear and linear modulation portions.

The frequency modulation waveforms of the present invention also may be approximated by waveforms having both non-linear and linear portions. For example, as illustrated in FIG. 7B, frequency modulation waveform 16 comprises linear frequency modulation portion 16B at high frequencies and non-linear frequency modulation portion 16A at low frequencies, or vice versa. Non-linear portion 16A may be approximated by EQS. 5-7 or 8-13. If portion 16A is defined by EQS. 8-13, $F_{MIN}$ and $F_{MAX}$ are the minimum and maximum frequencies (respectively) within the frequency range defined by non-linear frequency modulation portion 16A, $T_{CYCLE}$ is equal to the period of non-linear portion 16A, and t is the time associated with a corresponding switching frequency ($f_S$) within each cycle of non-linear waveform 16A. Alternatively, frequency modulation waveform 16 may comprise linear frequency modulation portion(s) interposed between non-linear frequency modulation portions, or vice versa.

As used herein, the term "pseudo-random frequency modulation" refers to frequency modulation in which the frequency of the clock signal "hops" among different frequencies in a pseudo-random fashion. As used herein, the term "sequential frequency modulation" refers to frequency modulation in which the frequency of the clock signal increases and/or decreases in numeric order with time along a curve that approximates the desired frequency modulation waveform. When a signal frequency is modulated in accordance with a desired frequency modulation waveform, either pseudo-random or sequential modulation may be employed (depending on the frequency modulation circuit) to vary the signal frequency such that the values of the resulting signal frequency waveform, if sorted in increasing numerical order, form a curve that approximates the desired frequency modulation waveform. One of ordinary skill in the art will recognize that step-wise and smoothly continuous waveforms may be considered as comprising a series of discrete values for a given time differential.

Figure 8:
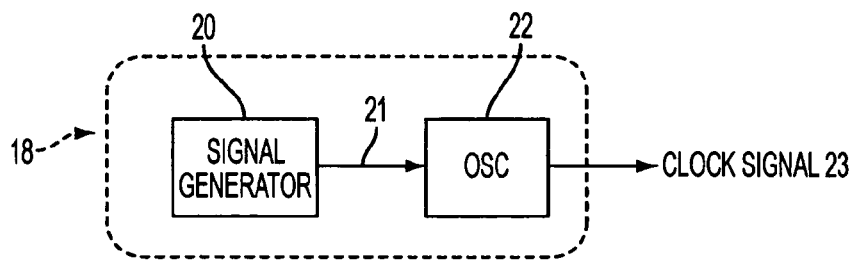
FIG. 8 is a simplified block diagram of the frequency modulation circuits of the present invention.

Referring now to FIG. 8, a simplified block diagram of frequency modulation circuit 18 of the present invention is described, in which oscillator 22 accepts signal 21 from signal generator 20 and generates clock signal 23 responsive thereto. Clock signal 23 has a varying frequency modulated in accordance with the frequency modulation waveforms of the present invention. To be described in greater detail hereinafter, signal generator 20 may be configured to modulate the frequency of clock signal 23 using pseudo-random or sequential modulation techniques by outputting a signal generator waveform having magnitudes that, if sorted in increasing numerical order, form a curve that approximates the shape of the frequency modulation waveforms of the present invention. In that case, oscillator 22 may be configured to have a linear input-output transfer characteristic so that the frequency of the generated clock signal is controlled responsive to non-linear signal 21. However, if signal generator 20 outputs a signal generator waveform having magnitudes that, if sorted in numerical order, form a curve that approximates a line, oscillator 22 can be configured to have a non-linear input-to-output transfer function that approximates the shape of the frequency modulation waveforms of the present invention. Alternatively, signal generator 20 may be configured to output a non-linear output signal to an oscillator that also is configured with a non-linear input-to-output transfer function. Together the signal generator and oscillator of each of these embodiments of frequency modulation circuit 18 generate a clock signal having a frequency that is modulated in accordance with the frequency modulation waveforms of the present invention.

When the operating frequency of a switching regulator is modulated in accordance with a frequency modulation waveform of the present invention, the operating frequency is varied within a range of switching frequencies that are bounded by minimum and maximum values (inclusive). Defined as the difference between the minimum and maximum frequency values divided by the average frequency value, a spreading range of 20-40% satisfies many applications. While a wider spreading range is preferable for pseudo-random frequency modulation, a spreading range that is too wide may cause derated performance (e.g., excessive ripple voltage, reduced efficiency, etc.). A user may reduce the spreading range by adjusting the capacitance of a low pass filter (hereinafter referred to as the "low pass signal control filter") discussed in greater detail below, or adjusting the resistance of a resistor that may be disposed in parallel with the capacitor of the low pass signal control filter. If the low pass signal control filter also incorporates a resistor in series with the capacitor, the user also may adjust the resistance of the series resistor to reduce the spreading range.

Figure 9:
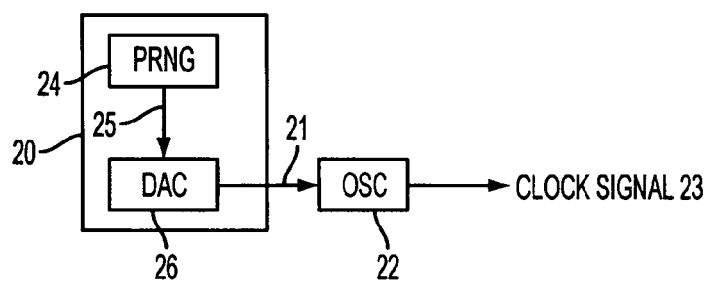
FIG. 9 is a simplified block diagram of a first embodiment of the frequency modulation circuits of the present invention, having a pseudo-random code generator and a digital-to-analog converter (DAC)
Figure 10:
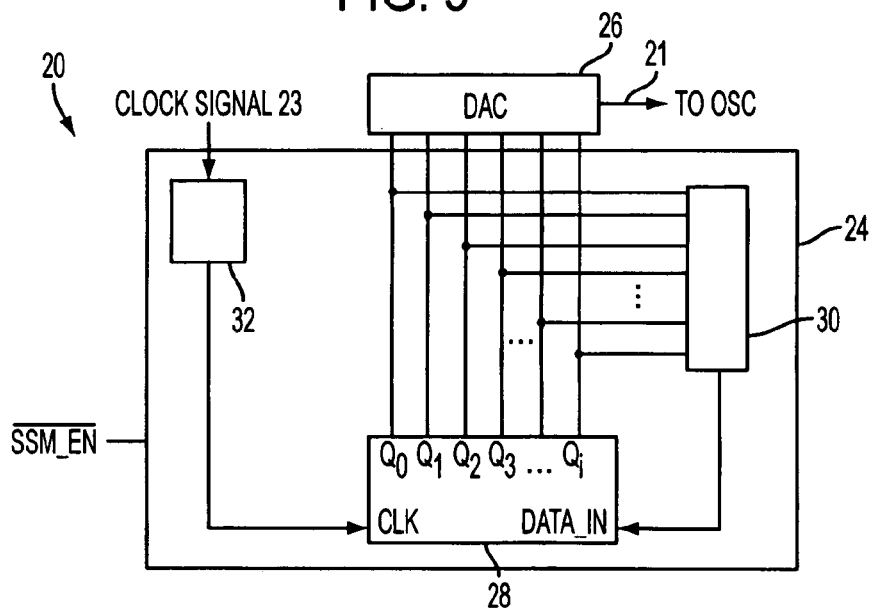
FIG. 10 is a simplified block diagram of a first embodiment of the pseudo-random code generator of FIG. 9.

In a first embodiment of frequency modulation circuit 18 of the present invention depicted in FIGS. 9 and 10, signal generator 20 comprises pseudo-random number generator 24 that supplies digital signals $Q_0$-$Q_i$ having a uniform probability density distribution to digital-to-analog converter ("DAC") 26. Pseudo-random number generator 24 comprises self-feeding shift register 28 having feedback circuit 30. Feedback circuit 30 may comprise logic that accept output signals from register 28 and generates a data signal derived therefrom. That data signal is fed back into the register's DATA_IN input. Although feedback circuit 30 is shown as accepting all signals output by register 28, one of ordinary skill in the art will recognize that feedback circuit 30 also may be configured to accept less signals. In general, only a few bits are needed. One of ordinary skill in the art will recognize that, rather than incorporating logic, feedback circuit 30 also may comprise a memory look-up table or other circuits that provide the desired probability density distribution from pseudo-random generator 24.

In one embodiment of signal generator 20, clock signal 23 may be fed into the clock (CLK) input of shift register 28. In this case, DAC 26 may need to be configured to compensate for any non-uniformity in the probability function resulting from the varying frequency of clock signal 23. Furthermore, if the regulator cannot keep up with the step changes in the frequency of clock signal 23, the switching regulator may exhibit loose regulation. To prevent the high-frequency components of the pseudo-random generator modulation signal from causing the switching regulator to exhibit loose regulation, pseudo-random generator 24 may incorporate frequency divider 32 to reduce the frequency of clock signal 23 to a value less than that of bandwidth $f_C$ of the switching regulator. To cover most, if not all, practical designs, bandwidth $f_C$ may be estimated by the following relationship:

$$\frac{f_C}{f_S} \geq \frac{1}{100} \qquad \text{EQ. 16}$$

where $f_S$ is the operating frequency of the switching regulator and the value of "100" incorporates a high safety factor. Accordingly, frequency divider 32 may comprise an n-bit counter that satisfies the following relationship:

$$2^n > 100 \qquad \text{EQ. 17}$$

While FIG. 10 illustrates frequency divider 32 as being incorporated within pseudo-random generator 24, one of ordinary skill in the art will recognize that the frequency divider also may be disposed external to the pseudo-random generator.

To be described in greater detail hereinbelow, the spread spectrum frequency modulation circuits of the present invention also may incorporate a low-pass signal control filter to control the slew rate from one frequency to the next to filter out the high-frequency components of the pseudo-random generator signal. As discussed above, the component values chosen for the low pass signal control filter also may affect the range of operating frequencies over which the switching regulator is modulated.

In addition to potentially causing the switching regulator to exhibit loose regulation, the high frequency components of the pseudo-random generator modulation signal also may contribute to audible noise. To reduce audible noise, shift register 28 may be designed to satisfy the following relationship:

$$\frac{f_S}{2^n(2^m - b)} \leq 20 \text{ Hz} \qquad \text{EQ. 18}$$

where $f_S$ may be approximated as the average frequency of the range of frequencies over which a switching regulator incorporating the spread spectrum frequency modulation circuits of the present invention is designed to operate, m is the number of bits of shift register 28, and b is equal to the number of states in which shift register 28 locks up. For example, if feedback circuit 30 is designed so that the shift register locks up in the all-zero state, b would be equal to one (1). However, if feedback circuit 30 does not cause the shift register to lock up in any state, b would be equal to zero (0). The low-pass signal control filter mentioned above also may be used to attenuate the high-frequency components of the pseudo-random generator, and thereby reduce audible noise. The corner frequency of the low-pass signal control filter may be selected to be higher than the clock rate of the shift register to preserve modulation range but lower than twice the clock rate to attenuate high frequency harmonics.

In an alternative embodiment of pseudo-random generator 24, shift register 28 accepts a reference clock signal that is independent of internally generated clock signal 23. To prevent the high-frequency components of the pseudo-random generator signal from causing the switching regulator to exhibit loose regulation and generate audible noise, the reference clock signal should comprise a frequency that is less than bandwidth $f_C$ of the application in which the switching regulator is incorporated.

Figure 11:
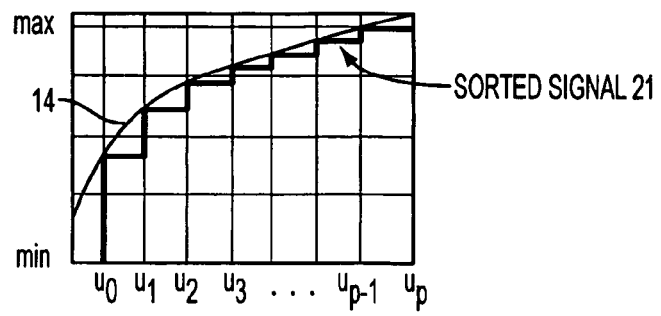
FIG. 11 is a graph of an illustrative input-to-output transfer function of the DAC of FIG. 9.

Referring now to FIG. 11, an illustrative input-to-output transfer function for DAC 26 is provided, in which the transfer function approximates the frequency modulation waveforms of the present invention. FIG. 11 provides an illustrative correlation between digital signal 25 from pseudo-random generator 24 and sorted signal 21 (i.e., signal 21 output by DAC 26 after signal 21 has been sorted in increasing numerical order over time). When DAC 26 receives signal $U_0$, which is a combination of pseudo-random generator output signals $Q_0$-$Q_i$, DAC 26 outputs a signal, e.g., having a minimum value that corresponds to the minimum frequency at which the switching regulator is designed to be operated. Likewise, when DAC 26 receives signal $U_P$, which is a different combination of pseudo-random generator output signals $Q_0$-$Q_i$, DAC 26 outputs a signal, e.g., having a maximum value that corresponds to the maximum frequency at which the switching regulator is designed to be modulated. If the magnitudes of signal 21 are sorted in increasing numerical order over time, the resulting step-wise continuous curve approximates the frequency modulation waveforms of the present invention. Although FIG. 11 illustratively depicts frequency modulation waveform 14 of the present invention being approximated by the left vertices of the steps in sorted signal 21, one of ordinary skill in the art will recognize that sorted signal 21 also may approximate waveform 14 at other locations in the step-wise continuous curve. For example, waveform 14 may be approximated by the right vertices or by the average values corresponding to the steps of the curve.

The number of signals DAC 26 is configured to accept may be equal to or less than the number of signals output by pseudo-random generator 24 absent an intervening decoder. One of ordinary skill in the art will recognize that m-bit pseudo-random generator 24 may be configured to output up to $2^m$-b signals, or a fewer number of signals depending on the requirements of the application and the preferences of the designer. However, to better approximate the frequency modulation waveforms of the present invention (i.e., increase resolution), pseudo-random generator 24 may be configured to supply DAC 26 with a greater number of signals either by increasing the number of bits the pseudo-random generator is configured to output, which may require that shift register 28 be configured to handle a greater number of bits, or DAC 26 may be configured to accept more bits than that output by pseudo-random generator 24 if a decoder is interposed between the pseudo-random generator and the DAC (as will be described in greater detail hereinafter).

One of ordinary skill in the art will recognize that, because the varying frequency of clock signal 23 may create additional non-linearity when it is used to clock shift register 28, the input-to-output transfer function of DAC 26 may be designed to compensate therefor.

Figure 12:
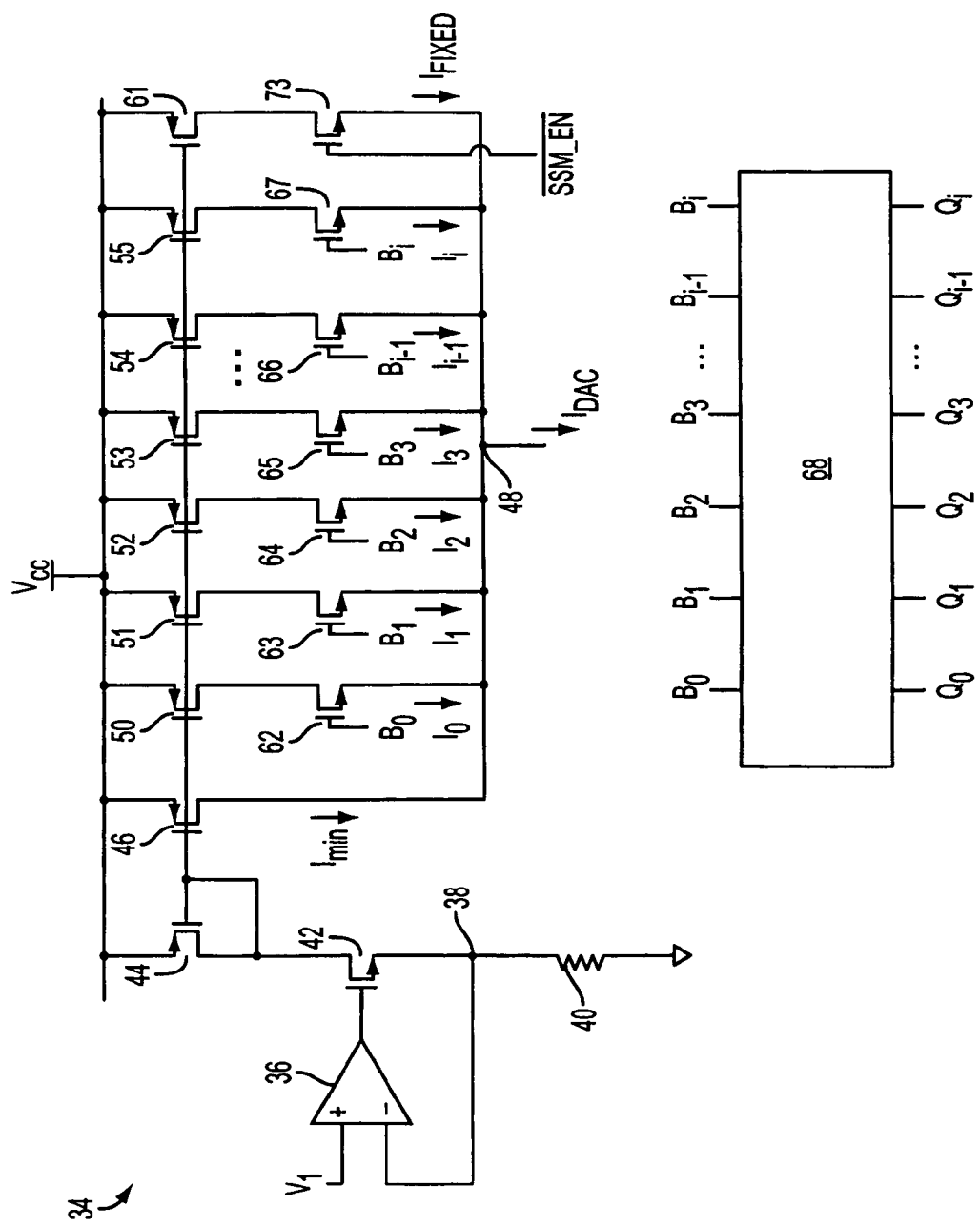
FIG. 12 is a first embodiment of a DAC that may be configured with the input-to-output transfer function of FIG. 11.

Referring now to FIG. 12, a first illustrative embodiment of DAC 26 is described. DAC 34 comprises operational amplifier 36 having a feedback loop that servos node 38 at reference voltage $V_1$, resistor 40 disposed between node 38 and ground, and transistor 42 having a gate connected to the output of operational amplifier 36, a source coupled to resistor 40 and a drain coupled to diode-connected transistor 44. Resistor 40 may be configured to have a resistance that can be trimmed to correct for frequency inaccuracies introduced during manufacturing.

To servo node 38 at reference voltage $V_1$, supply source $V_{CC}$ supplies as much current as necessary through diode-connected transistor 44 to establish the appropriate voltage drop across resistor 40. This current is mirrored by mirroring transistor 46 to generate proportional current $I_{MIN}$. Minimum current $I_{MIN}$ provides a constant current source to oscillator 22 to generate clock signal 23 having a minimum frequency value during spread spectrum frequency operation. As used herein, currents that are "proportional" in magnitude include the state in which the currents are equal in magnitude.

In addition to mirroring transistor 46, transistor 44 also is coupled to mirror transistors 50-55 to form multiple current mirrors in parallel, each of which may be independently activated when its corresponding switch 62-67 connects the current mirror to output node 48. Pseudo-random generator 24 controls each switch 62-67 by supplying signals $Q_0$-$Q_i$, which preferably are decoded by decoder 68 that is interposed between generator 24 and switches 62-67. Decoder 68 preferably incorporates a thermometer decoder for frequency modulation waveforms that are non-linear or a combination of thermometer and linear decoders for frequency modulation waveforms that are combinations of non-linear and linear portions. Decoder 68 accepts pseudo-random generator signals $Q_0$-$Q_i$ and supplies decoder signals $B_0$-$B_i$ to control switches 62-67 directly. For example, when the pseudo-random generator outputs signals that causes decoder 68 to provide a "1" to switch 66, switch 66 closes, permitting mirroring transistor 54 to mirror current flowing through transistor 44. However, when pseudo-random generator 24 outputs signals that causes decoder 68 to provide a "0" to switch 66, the switch opens and no current is permitted to be mirrored by transistor 54. All generated current $I_{MIN}$ and $I_0$-$I_i$ are aggregated at output node 48 to form DAC output current $I_{DAC}$. To be discussed in greater detail hereinafter, oscillator 22 is configured to generate clock signal 23 having a frequency that corresponds to the magnitude of DAC output current $I_{DAC}$ when spread spectrum frequency modulation is enabled.

To modulate the frequency of clock signal 23 in accordance with the frequency modulation waveforms of the present invention, the output of pseudo-random generator 24, decoder 68, and the width-to-length (W/L) ratios (also known as aspect ratios) of transistors 50-55 are designed so that DAC 34 has an input-to-output transfer function similar to that illustratively provided in FIG. 11. Pseudo-random generator 24 may be configured to turn on one or more of the current mirrors formed by transistor 44 and mirroring transistors 50-55 at one time. DAC 34 also may comprise additional current mirrors that may be activated by combining the decoder signals, e.g., a signal equal to $B_0+B_1$. To combine the decoder signals, logic gates may be used.

Non-linearity also may be realized by forcing one or more transistors forming a current mirror in DAC 26 or oscillator 22 to operate in the linear region when its complementary mirroring transistor operates in the saturation region. Accordingly, rather than configuring the output of pseudo-random generator 24, decoder 68 and the width-to-length (W/L) ratios of transistors 50-55 to provide DAC 34 with an input-to-output transfer function similar to that illustratively provided in FIG. 11, the desired non-linearity may be realized by forcing one or more transistors forming a current mirror in DAC 26, oscillator 22, or another part of frequency modulation circuit 18 to operate in the linear region when its complementary mirroring transistor operates in the saturation region. In that case, DAC 26 preferably is configured with a linear input-to-output transfer function and generator output signals $Q_0$-$Q_i$ may control switches 62-67 directly.

To be discussed in greater detail hereinbelow, DAC 34 also may comprise an additional current mirror that is formed by transistors 44 and 61 and that may be activated responsive to a user-programmable signal SSM_EN. In fixed frequency operation, this additional current mirror biases the minimum switching frequency to a value that is different than the minimum switching frequency established by minimum current $I_{MIN}$ in spread spectrum operation. As used herein, the term "user-programmable" refers to the capability of varying parameters of the circuits with external components or user-supplied signals.

The current mirrors depicted in the figures herein comprise basic current mirror configurations for illustrative purposes only and are not intended to limit the scope of the invention. One of ordinary skill in the art will recognize that the current mirrors also may comprise cascoded configurations to isolate the mirroring transistors from load-induced voltage changes at the output of the current mirror. Alternative configurations of current mirrors also may be used, e.g., Wilson configuration mirrors and modified Wilson configuration mirrors. While the figures depicted herein show current mirrors comprising MOSFETs, one of ordinary skill in the art will recognize that any type of transistor or combinations of transistors may be used, e.g., bipolar transistors or insulated gate bipolar transistors.

Figure 13A:
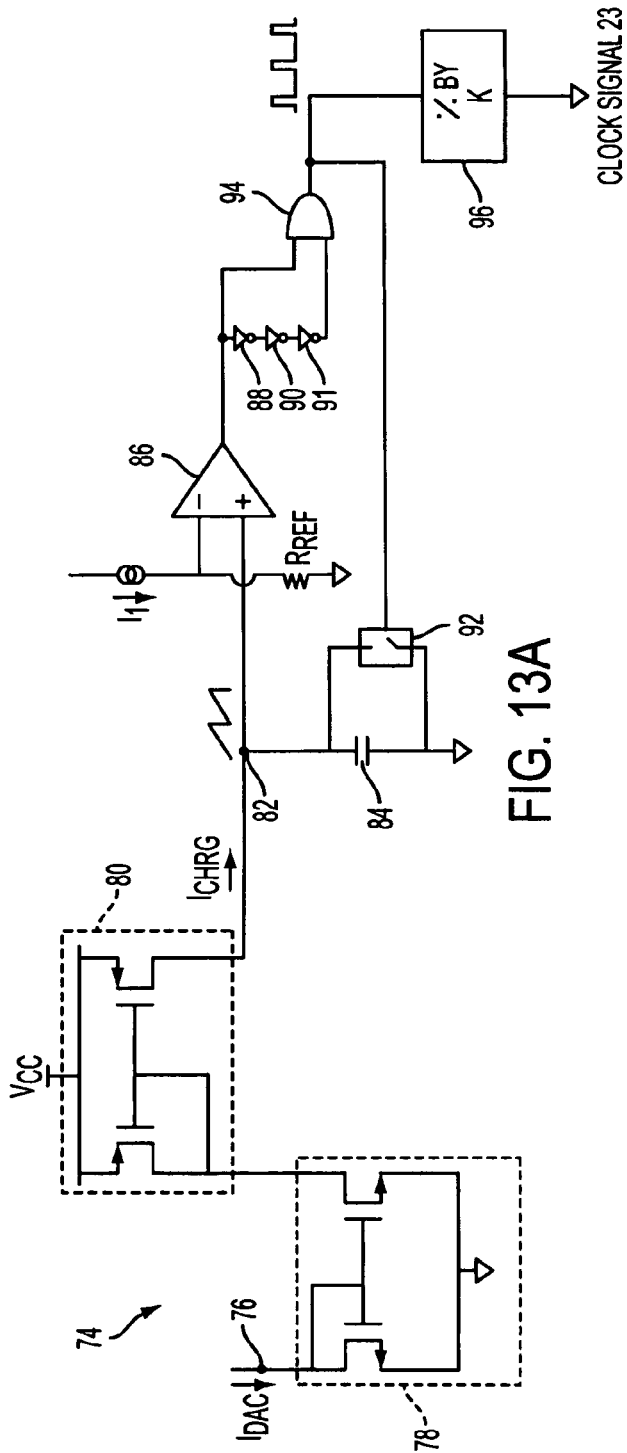
FIGS. 13A-B are first and second embodiments of an oscillator having linear input-to-output transfer functions.

FIG. 13A depicts a first illustrative embodiment of oscillator 22 for use with, e.g., DAC 34 of FIG. 12. Oscillator 74 accepts DAC output current $I_{DAC}$ at input node 76. A series of optional current mirrors 78 and 80 generate charging current $I_{CHRG}$ having a magnitude proportional to DAC output current $I_{DAC}$. Charging current $I_{CHRG}$ charges timing capacitor 84, which is coupled to ground, increasing the voltage at node 82. When the voltage at node 82 reaches or exceeds the reference voltage established by reference current $I_1$ and reference resistor $R_{REF}$ (or alternatively established directly by a reference voltage $V_1$), comparator 86 outputs a signal HIGH, which is directed through inverters 88, 90 and 91 to switch 92. When switch 92 closes, it shorts timing capacitor 84 to ground, discharging the capacitor. Once timing capacitor 84 has discharged enough such that the voltage at node 82 is less than the reference voltage established by reference current $I_1$ and reference resistor $R_{REF}$, comparator 86 outputs a signal LOW that opens switch 92, permitting charging current $I_{CHRG}$ to recharge timing capacitor 84. In an alternative embodiment, oscillator 74 may accept DAC output current $I_{DAC}$ directly at node 82.

The charging and discharging of timing capacitor 84 establishes a ramped waveform at node 82 that may be used as a ramped clock signal. A pulsed, rectangular clock signal having the same frequency as the ramped waveform at node 82 may be pulled directly from the output of comparator 86 or generated by the output of AND gate 94, which is connected in parallel across inverters 88, 90 and 91. Inverters 88, 90 and 91 accommodate for delays in the remaining circuitry when the timing capacitor is being discharged, and may be replaced with other delay circuitry, e.g., timers.

If the switching regulator is configured to accommodate more than one phase (i.e., K-phases), the frequency of the clock signal generated from the charging and discharging of timing capacitor 84 is divided by frequency divider 96 comprising, e.g., a counter configured as a K frequency divider. The output of frequency divider 96 is clock signal 23.

The frequency of clock signal 23 corresponds to the magnitude of charging current $I_{CHRG}$. As the magnitude of charging current $I_{CHRG}$ increases, timing capacitor 84 charges at a faster rate and thus the voltage at node 82 reaches the reference voltage established by reference current $I_1$ and reference resistor $R_{REF}$ in a shorter amount of time. This generates a clock signal with an increased frequency. Likewise, when the magnitude of charging current $I_{CHRG}$ decreases, so too does the frequency of clock signal 23. Accordingly, when the waveform of output current $I_{DAC}$ from DAC 34 is modulated in accordance with the frequency modulation waveforms of the present invention, so too is the frequency of clock signal 23.

As used herein, a signal is modulated in accordance with the frequency modulation waveforms of the present invention when the signal develops a signal waveform over time having magnitudes that, if sorted in increasing numerical order, form a curve that approximates the shape of the frequency modulation waveforms of the present invention. As used herein, a signal modulates the frequency of clock signal 23 in accordance with the frequency modulation waveforms of the present invention when the frequency of the clock signal develops a frequency waveform over time having magnitudes that, if sorted in increasing numerical order, form a curve that approximates the frequency modulation waveforms of the present invention.

Figure 13B:
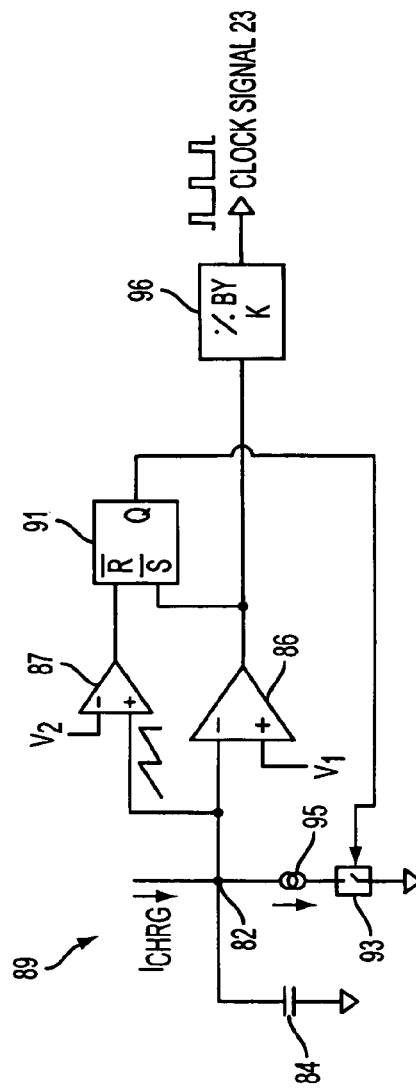

Referring now to FIG. 13B, an alternative embodiment of oscillator 74 is described, in which the circuit configured to discharge timing capacitor 84 is modified slightly. Oscillator 89 comprises latch 91 that monitors the output of comparator 86 and the voltage at node 82. When charging current $I_{CHRG}$ has charged timing capacitor 84 to a voltage level that equals or exceeds reference voltage $V_1$, latch 91 sets and outputs a signal HIGH to switch 93. Switch 93 then closes to discharge timing capacitor 84 by coupling current sink 95 to ground. Generally, current source 95 is configured to discharge timing capacitor 84 at a rate faster than the rate at which charging current $I_{CHRG}$ charges the timing capacitor. However, current source 95 also may be configured to discharge timing capacitor 84 at the same rate at which charging current $I_{CHRG}$ charges the timing capacitor or at a slower rate. When the timing capacitor is discharged to a point at which the voltage at node 82 reduces below reference voltage $V_2$, comparator 87 outputs a signal LOW that resets latch 91, which outputs a signal LOW to switch 93. This opens the switch to decouple current sink 95 from ground, and thereby permit charging current $I_{CHRG}$ to recharge capacitor 84.

Figure 14:
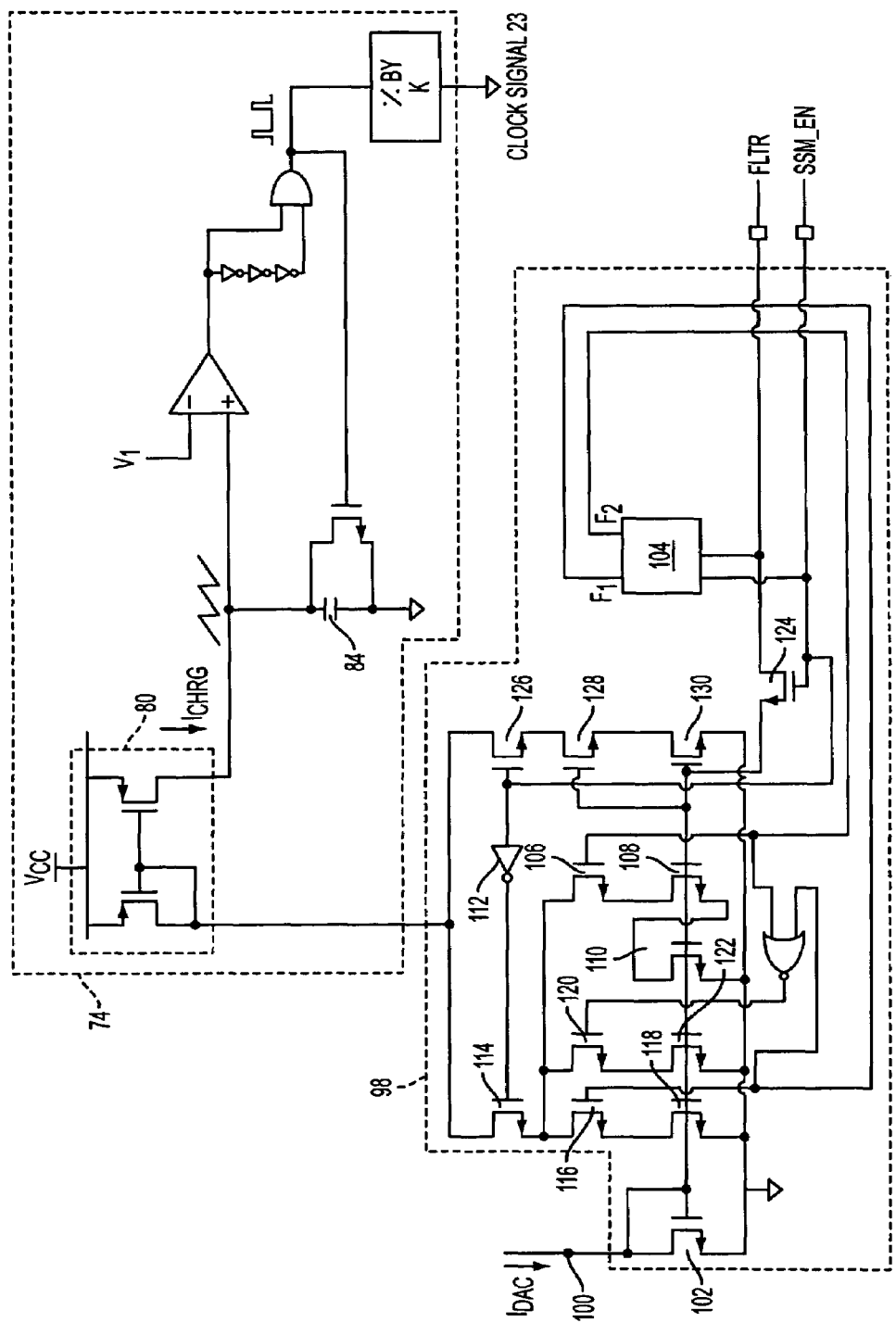
FIG. 14 is a schematic of a circuit that permits a user to disable spread spectrum frequency modulation in favor of fixed frequency modulation.

To provide greater flexibility for the user, a switching regulator incorporating the frequency modulation circuits of the present invention may be configured to permit a user to disable spread spectrum frequency modulation and enable fixed frequency operation. FIG. 14 illustrates circuit 98 configured to provide such functionality. When a user desires to disable spread spectrum frequency modulation, the user would supply a signal LOW to input pin SSM_EN and a DC voltage to input pin FLTR. The signal LOW supplied to input pin SSM_EN disables pseudo-random generator 24 so that switches 62-67 of DAC 34 are kept open (see FIG. 12). The signal LOW to input pin SSM_EN also closes switch 73 of DAC 34 to permit mirroring transistor 61 to generate constant current $I_{FIXED}$ that is proportional to current flowing through transistor 44. DAC 34 then outputs the sum of constant currents $I_{FIXED}$ and $I_{MIN}$ to input node 100 of circuit 98.

Circuit 98 permits a user to direct oscillator 74 to generate a clock signal having one of three fixed frequencies by applying certain input signals to input pin FLTR. Logic detector 104 detects these input signals when a signal LOW is supplied to input pin SSM_EN, and outputs signals from detector outputs F1 and F2 in accordance therewith. For example, when input pin FLTR is coupled to ground in a first user-programmable fixed frequency state, detector 104 outputs a signal HIGH from output F2 and a signal LOW from output F1. This closes switch 106 which is coupled in series with mirroring transistors 108 and 110, both of which mirror current flowing through diode-connected transistor 102 to generate a current proportional to current $I_{DAC}$. That generated current is directed through switch 114, which closes responsive to the signal LOW of input pin SSM_EN after the signal is inverted by inverter 112. To charge timing capacitor 84, current mirror 80 of oscillator 74 generates charge current $I_{CHRG}$ having a magnitude proportional to the current generated by mirroring transistors 108 and 110. One of ordinary skill in the art will recognize that transistors 108 and 110 may be consolidated into a single transistor.

When input pin FLTR is coupled to voltage source $V_{CC}$ or the input voltage of the switching regulator, for example, in a second user-programmable fixed frequency state and a signal LOW is supplied to input pin SSM_EN, fixed frequency detector 104 outputs a signal HIGH from detector output F1 and a signal LOW from detector output F2, This disables switch 106 and transistors 108 and 110, but enables mirroring transistor 118 and closes switches 114 and 116, thereby permitting transistor 118 to generate a current proportional to current $I_{DAC}$. To charge timing capacitor 84, current mirror 80 of oscillator 74 generates charge current $I_{CHRG}$ having a magnitude proportional to the current generated by mirroring transistor 118. If transistor 118 is configured to have a W/L ratio (or aspect ratio) that generates more current than that generated by transistors 108-110, clock signal 23 will have a frequency in the second fixed frequency state that is greater than that of the clock signal generated in the first fixed frequency state.

If input pin FLTR is left to float and input pin SSM_EN is supplied with a signal LOW in a third user-programmable fixed frequency state, fixed frequency detector 104 outputs signals LOW from both detector outputs F1 and F2. This keeps switches 106 and 116 open and turns off transistors 108, 110 and 118, but turns on transistor 122 and closes switches 114 and 120, thereby permitting mirroring transistor 122 to mirror current $I_{DAC}$. If transistor 122 is configured to have a W/L aspect ratio that generates more current than that generated by mirroring transistors 108 and 110 but less current than that generated by mirroring transistor 118, clock signal 23 will have a frequency in the third fixed frequency state that is higher than that of the clock signal generated in the first fixed frequency state but lower than that of the clock signal generated in the second fixed frequency state. One of ordinary skill in the art will recognize that circuit 98 may be modified slightly to enable additional fixed frequency states.

When a user desires to enable spread spectrum frequency modulation, a signal HIGH is supplied to input pin SSM_EN. This enables pseudo-random generator 24, and disables (1) the current mirror formed by transistors 44 and 61 of DAC 34 and (2) switch 114 of circuit 98 so that, regardless of the voltage at input pin FLTR, switches 106, 116 and 120 prevent current from flowing through transistors 108, 100, 118 and 122.

To protect against loose regulation by the switching regulator and reduce audible noise, a low pass signal control filter may be coupled to input pin FLTR, e.g., a capacitor coupled to ground. The low pass signal control filter is coupled to the gate of diode-connected transistor 102 when the signal HIGH to input pin SSM_EN closes switch 124.

To generate charging current $I_{CHRG}$, the signal HIGH to input pin SSM_EN also closes switch 126 and enables mirroring transistors 128 and 130, which can be consolidated into a single transistor. This permits mirroring transistors 128 and 130 to mirror DAC output current $I_{DAC}$, which signal generator 20 modulates in accordance with the frequency modulation waveforms of the present invention.

Figure 15:
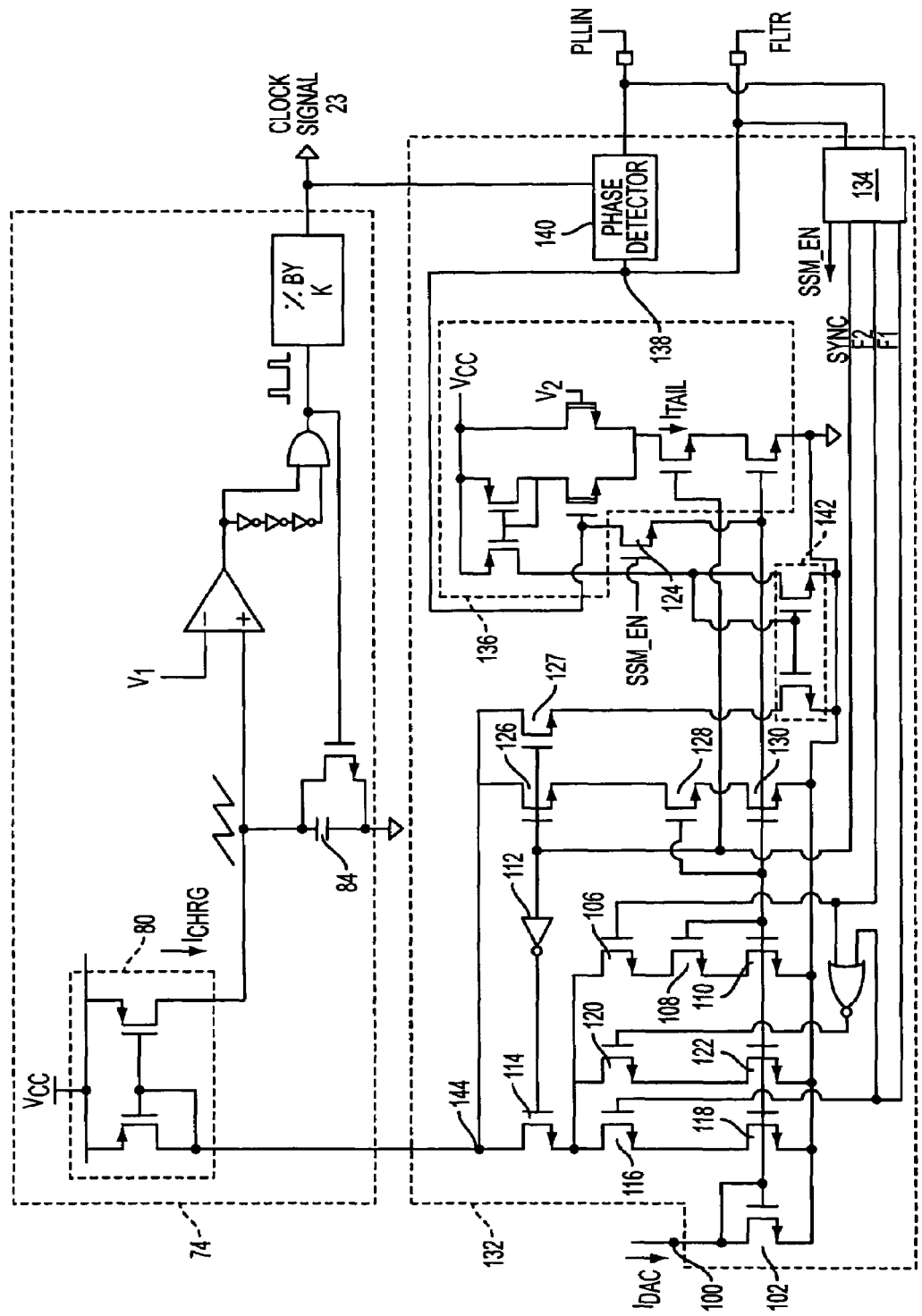
FIG. 15 is a schematic of a circuit that permits a user to disable spread spectrum frequency modulation in favor of fixed frequency modulation or synchronization of the internal clock signal with an external clock signal.

To provide even greater flexibility for the user, a switching regulator incorporating the frequency modulation circuits of the present invention may incorporate circuit 132 (see FIG. 15) that permits a user to disable spread spectrum frequency modulation and enable either fixed frequency operation or synchronization of clock signal 23 with an external clock signal supplied to input pin PLLIN. Components of circuit 132 having reference numbers common with circuit 98 of FIG. 14 represent similar components.

Circuit 132 accepts two user-programmable inputs at user-programmable multi-state input pins PLLIN and FLTR. Each input pin is coupled to logic detector 134 configured to detect the input signals at pins PLLIN and FLTR and to output signals at detector outputs SSM_EN, SYNC, F2 and F1 in accordance therewith. For example, when a user wants to disable spread spectrum frequency operation and synchronize clock signal 23 to an external clock signal, the external clock signal is supplied to input pin PLLIN and a low-pass filter for phase locked loop synchronization is coupled to input pin FLTR, e.g., an RC filter coupled to ground. When detector 134 detects the external clock signal at pin PLLIN, detector 134 outputs a signal LOW from detector output SSM_EN and a signal HIGH from detector output SYNC. Like circuit 98 of FIG. 14, this disables the pseudo-random generator and enables the current mirror formed by transistors 44 and 61 of DAC 34 (see FIG. 12) to generate fixed current $I_{FIXED}$. DAC 34 outputs the sum of constant currents $I_{FIXED}$ and $I_{MIN}$ as DAC output current $I_{DAC}$, which circuit 132 feeds to the tail current of current steering comparator 136. Current steering comparator 136 compares reference voltage $V_2$ to the voltage at node 138, which is established by the output of phase detector 140 and the low pass filter coupled to input pin FLTR. The output current from current steering comparator 136 is mirrored by current mirror 142.

When detector output SYNC is HIGH, switches 126 and 127 close and the current mirrors formed by diode-connected transistor 102 and mirroring transistors 128 and 130 are enabled to mirror DAC output current $I_{DAC}$. This current, along with the current generated by current mirror 142, aggregates at node 144 to form charging current $I_{CHRG}$. In phase locked loop, the output of phase detector 140 determines the magnitude of charging current $I_{CHRG}$, which in turn determines the frequency of clock signal 23.

When a user desires to disable synchronization as described above and enable programmed fixed frequency operation, input pin PLLIN is supplied with a first known voltage state, e.g., the voltage at the feedback pin of the switching regulator. This causes detector 134 to output LOW signals from both the SSM_EN and SYNC outputs. In a manner similar to circuit 98, the F1 and F2 outputs are determined by the user-programmable input conditions to input pin FLTRs. Detector 134 detects the input conditions at input pin FLTR and directs oscillator 74 to generate a clock signal having one of, e.g., three fixed frequencies.

When a user desires to modulate the frequency of clock signal 23 in accordance with the frequency modulation waveforms of the present invention, input pin PLLIN is supplied with a second known voltage state, e.g., the voltage established by coupling a predetermined resistance between the power supply of the switching regulator and input pin PLLIN. To protect against loose regulation by the switching regulator and to reduce audible noise, a low pass signal control filter may be coupled to input pin FLTR, e.g., a capacitor coupled to ground. Responsive to the signal at input pin PLLIN, detector 134 outputs a signal HIGH to detector output SSM_EN and a signal LOW to detector output SYNC. This disables current steering comparator 136 by shutting off its tail current $I_{TAIL}$, closes switch 114, and couples the low pass signal control filter connected to input pin FLTR to the gate of diode-connected transistor 102. To provide a current path between input node 100 and oscillator 74, detector 134 outputs signal LOW on detector outputs F1 and F2, closing switch 120 and enabling mirroring transistor 122. Alternatively, detector 134 may (1) close switch 116 and enable mirroring transistor 118, or (2) close switch 106 and enable mirroring transistors 108 and 110.

While circuit 132 guides DAC output current $I_{DAC}$ directly to oscillator 74 to modulate the frequency of clock signal 23, the frequency of clock signal 23 also may be modulated by supplying a pseudo-random modulated clock signal to the input of phase detector 140. The alternative configuration, however, requires an extra user-accessible input pin to be bound out from the circuit if spread-spectrum frequency modulation is to be a user-selectable feature. By feeding the DAC signal to the oscillator as in circuit 132, no additional user-accessible pins are bound out since the DAC signal is coupled to input pin FLTR, which already is bound out for the user to provide the phase error filter in phase locked loop operation and to program the operating frequency of the switching regulator in fixed frequency operation.

Figure 16:
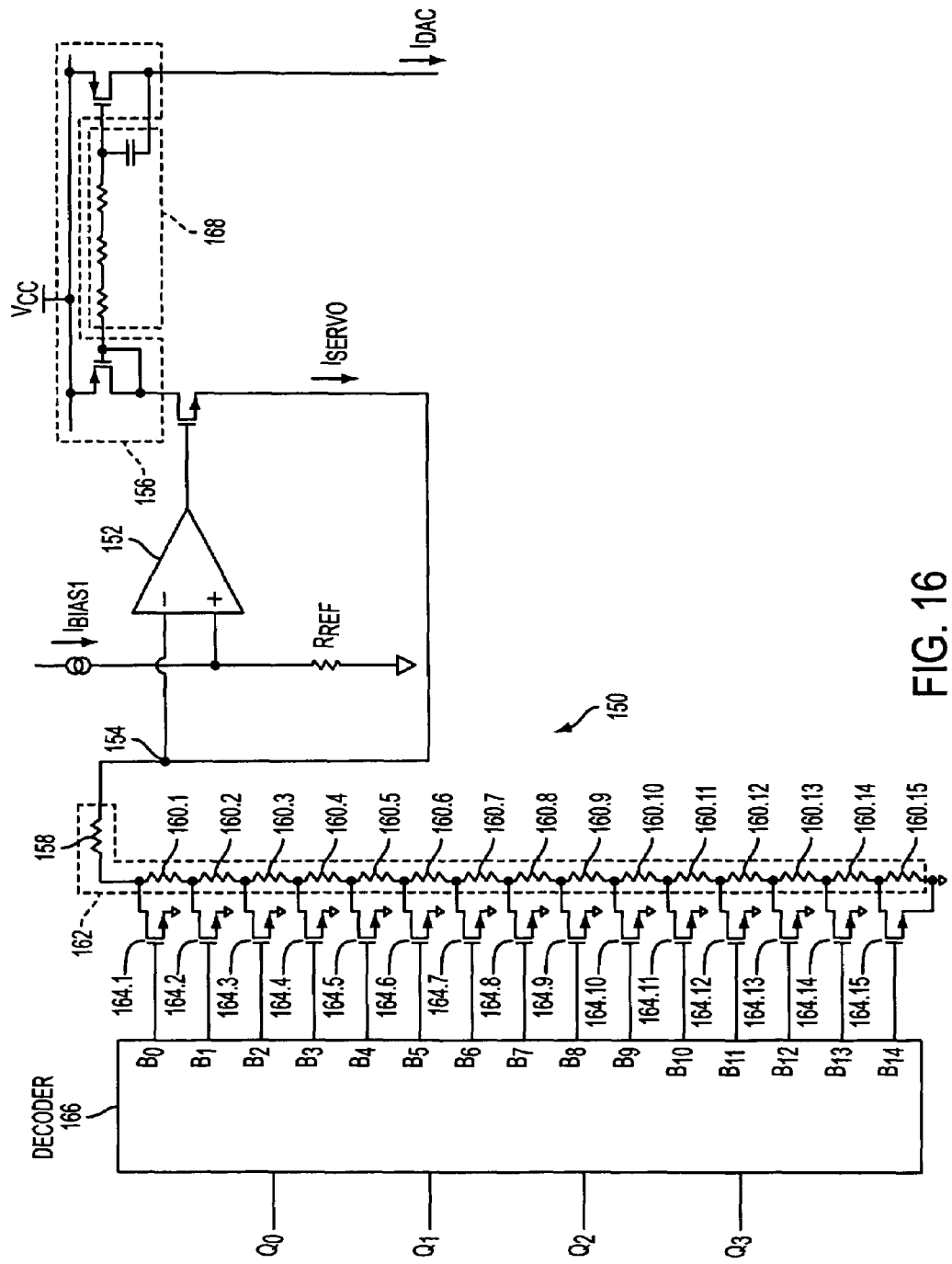
FIG. 16 is a second embodiment of a DAC that may be configured with the input-to-output transfer function of FIG. 11.

Referring now to FIG. 16 of the present invention, a second illustrative embodiment of DAC 26 is described. DAC 150 comprises amplifier 152 having a feedback loop that servos its inverting input 154 at the reference voltage established at its non-inverting input by biasing current $I_{BIAS1}$ and reference resistor $R_{REF}$. To servo node 154 at the reference voltage established at the non-inverting input of amplifier 152, current mirror 156 supplies as much current $I_{SERVO}$ as necessary to establish the appropriate voltage drop across one or more resistors coupled between node 154 and ground. More specifically, DAC 150 comprises resistors 158 and 160.1-160.15 disposed in series between node 154 and ground. Resistors 158 and 160 collectively will be referred to as variable resistance resistor 162.

The resistance of variable resistance resistor 162 is inversely proportional to the magnitude of current $I_{SERVO}$ supplied by current mirror 156 to servo node 154. Since current mirror 156 generates current $I_{DAC}$ proportional to current $I_{SERVO}$ and current $I_{DAC}$ is output to oscillator 74 to generate clock signal 23, the resistance of resistor 162 also is inversely proportional to the frequency of clock signal 23. More specifically, as the resistance of resistor 162 increases, current supplied by current mirror 156 to servo node 154 decreases, causing a proportional decrease in current $I_{DAC}$. This in turn reduces the frequency of clock signal 23 in a manner similar to that described in greater detail above. Conversely, as the resistance of resistor 162 decreases, current supplied by current mirror 156 to servo node 154 increases, causing a proportional increase in current $I_{DAC}$, which in turn increases the frequency of clock signal 23. Accordingly, by appropriately modulating the resistance of variable resistance resistor 162, the frequency of clock signal 23 is modulated in accordance with the frequency modulation waveforms of the present invention.

To adjust the resistance of variable resistance resistor 162, DAC 150 employs plurality of switches 164.1-164.15 coupled between ground and nodes interposed between adjacent resistors comprising variable resistance resistor 162. When a maximum frequency of clock signal 23 is desired, switch 164.1, which is disposed between resistor 158 and ground, is short-circuited to provide a minimum resistance at node 154. Conversely, when a minimum frequency is desired, switches 164.1-164.15 are kept in an open-circuit state to provide maximum resistance at node 154. Variable resistance resistor 162 can be adjusted to have intermediate resistances by short-circuiting one of intermediate switches 164.2-164.14. The resistances of resistors 160.1-160.15 are selected so that DAC 150 modulates DAC output current $I_{DAC}$ in accordance with the frequency modulation waveforms of the present invention.

DAC 150 controls when switches 164.1-164.15 short-circuit responsive to signals $Q_0$-$Q_i$ output by pseudo-random generator 24. The signals output by the pseudo-random generator preferably are decoded by decoder 166, which outputs signals $B_0$-$B_i$ to control switches 164.1-164.15 directly. For example, if pseudo-random generator 24 outputs four (4) bits, DAC 150 may incorporate, e.g., 15 switches (up to a maximum of 16 switches when generator 24 outputs four bits). Decoder 166 then is configured to accept signals $Q_0$-$Q_3$ of generator 24 and output signals $B_0$-$B_{14}$ to control switches 164.1-164.15 directly. One of ordinary skill in the art will recognize that the resolution between different levels of output current $I_{DAC}$ may be altered by increasing or decreasing the number of switches 164 and the number of output signals from decoder 166 and/or pseudo-random code generator 24.

DAC 150 also may comprise low pass signal control filter 168 coupled to current mirror 156 to protect the switching regulator from loose regulation and to reduce audible noise. Alternatively, low pass signal control filter 168 also may be coupled to input pin FLTR as described with respect to FIG. 14, if the FLTR pin is available.

While resistors 158 and 160 are disposed in series between node 154 and ground, one of ordinary skill in the art will recognize that the resistors also maybe disposed in parallel between node 154 and ground. Resistors 158 and 160 also may be replaced with other circuit elements having impedance, e.g., MOSFETs, capacitors, inductors, etc.

Figure 17:
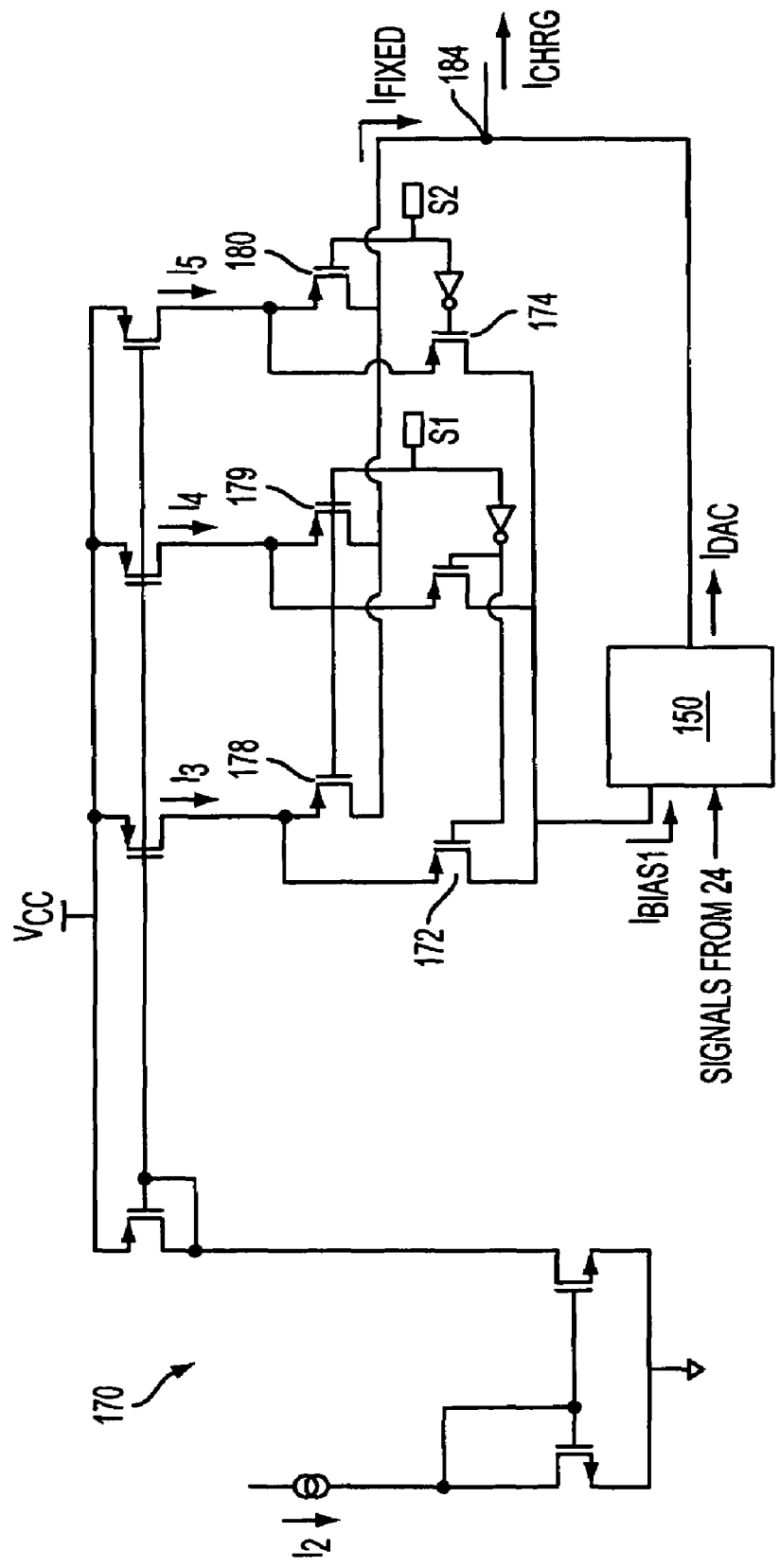
FIG. 17 is a circuit similar to FIG. 14 that permits a user to disable spread spectrum frequency modulation in favor of fixed frequency modulation.

In accordance with another aspect of the present invention, the digital-to-analog converters described herein may be user-programmed to control the range of frequencies over which a switching regulator that incorporates the frequency modulation circuits of the present invention operates. For example, circuit 170 illustrated in FIG. 17 permits a user to program bias current $I_{BIAS1}$ of DAC 150 in accordance with user-programmable signals supplied to pins S1 and S2. Pins S1 and S2 may be programmed by an $I^2C$ bus, directly programmed by a user, or programmed by another method known to one of ordinary skill in the art or otherwise. Circuit 170 comprises a plurality of current mirrors that generate constant biasing currents $I_3$-$I_5$ from reference current $I_2$. When both input pins S1 and S2 are supplied with HIGH signals, switches 172-174 turn on and switches 178-180 turn off. This directs all biasing currents $I_3$-$I_5$ to DAC 150 so that biasing current $I_{BIAS1}$ has a maximum magnitude. In this case, current $I_{CHRG}$ output by circuit 170 to oscillator 74 at output node 184 comprises only DAC output current $I_{DAC}$.

When input pin S1 is supplied with a signal HIGH and input pin S2 is supplied with a signal LOW, biasing current $I_{BIAS1}$ is supplied only with biasing current $I_3$ and $I_4$, while constant biasing current $I_5$ is aggregated with DAC output current $I_{DAC}$ at output node 184. Likewise, when input pin S1 is supplied with a signal LOW and input pin S2 is supplied with a signal HIGH, biasing current $I_{BIAS1}$ is supplied only with biasing current $I_5$, while constant biasing currents $I_3$ and $I_4$ are aggregated with DAC output current $I_{DAC}$ at output pin 184. The latter two states may result in a frequency spreading range that is narrower than that realized when all biasing currents $I_3$-$I_5$ are aggregated to form biasing current $I_{BIAS1}$, depending on the magnitudes of currents $I_3$-$I_5$.

When both input pins S1 and S2 are supplied with LOW signals, switches 172-174 turn off and switches 178-180 turn on. This directs all constant biasing currents $I_3$-$I_5$ to oscillator 74 and no current is provided to biasing current $I_{BIAS1}$, effectively disabling DAC 150 and spread spectrum frequency modulation. Instead, because charging current $I_{CHRG}$ now is constant, clock signal 23 is generated with a fixed frequency. One of ordinary skill in the art will recognize that fixed frequency operation also may be considered a fourth level of spread spectrum operation, i.e., when there is zero (0) frequency spreading. One of ordinary skill in the art will recognize that circuit 170 may be used to control the spreading range of other DACs described herein.

Figure 18:
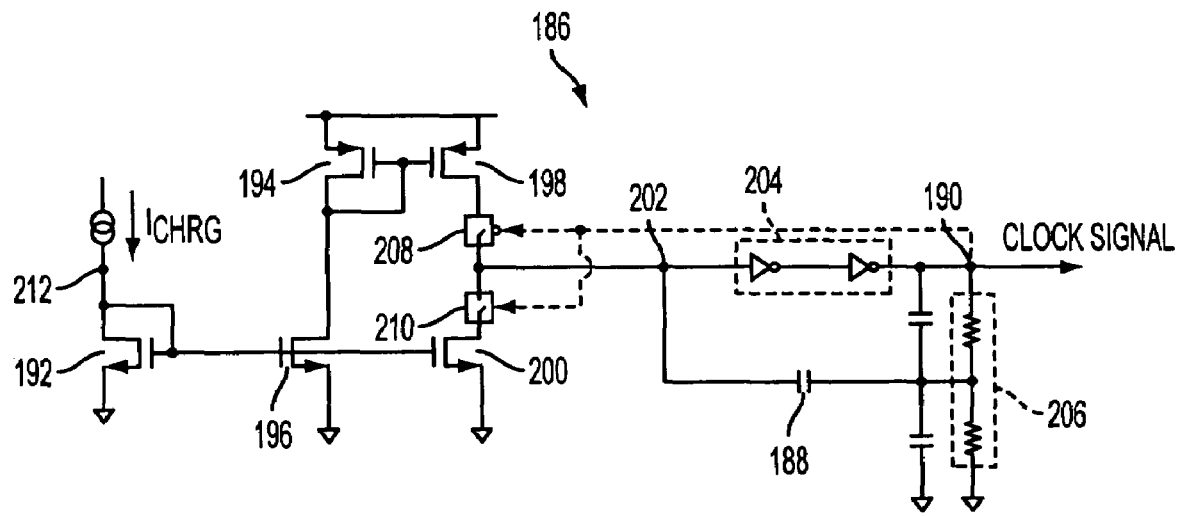
FIG. 18 is third embodiment of an oscillator having a linear input-to-output transfer function.

Referring now to FIG. 18, a third embodiment of oscillator 22 is described, in which the oscillator has a linear input-to-output transfer function. Oscillator 186 comprises a ring oscillator having timing capacitor 188 that is charged and discharged by a sourcing current source and a sinking current source (respectively) to generate a clock signal at output node 190. More specifically, to charge timing capacitor 188, oscillator 186 comprises a sourcing current source formed by diode-connected transistors 192 and 194 that respectively are coupled to mirroring transistors 196 and 198. The sourcing current source charges timing capacitor 188 with a current having a magnitude that is proportional to charging current $I_{CHRG}$. The sinking current source of oscillator 186 is formed by diode-connected transistor 192 and mirroring transistor 200, which together discharge capacitor 188 with a current having a magnitude that is proportional to charging current $I_{CHRG}$.

When the sourcing current source charges timing capacitor 188, the voltage at node 202 interposed between the sourcing and sinking current sources increases in magnitude. Once that voltage reaches or exceeds the threshold voltage of buffer 204, that voltage is passed to output node 190. Resistive divider 206, which is connected to timing capacitor 188, divides the voltage at node 190. Because the voltage drop across capacitor 188 cannot change instantaneously, the divided voltage established by resistive divider 206 forces the voltage at node 202 also to decrease to that value.

The voltage at node 190 also causes switch 208 to open and switch 210 to close, decoupling the sourcing current source from charging capacitor 188 and coupling the sinking current source to discharge capacitor 188. Once the sinking current source has discharged the timing capacitor, switch 210 opens and switch 208 again closes to recharge the timing capacitor. As timing capacitor 188 repeatedly is charged and discharged, a clock signal is generated at output node 190. To generate a clock signal having a frequency that is modulated in accordance with the frequency modulation waveforms of the present invention, input node 212 may be coupled to non-linear DAC 150 of FIG. 16 or any of the non-linear signal generators described herein that modulates charging current $I_{CHRG}$ in accordance with the frequency modulation waveforms of the present invention.

Figure 19:
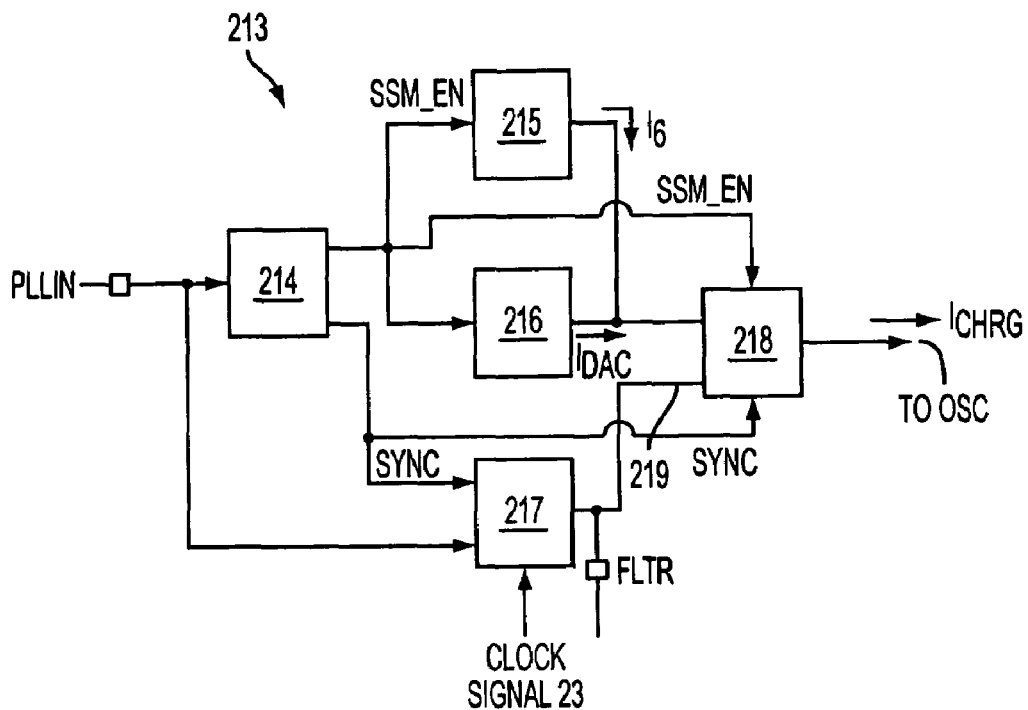
FIG. 19 is a circuit similar to FIG. 15 that permits a user to disable spread spectrum frequency modulation in favor of fixed frequency modulation or synchronization of the internal clock signal with an external clock signal.

FIG. 19 illustrates an alternative embodiment of a circuit that permits a user to select whether the frequency of the internal clock signal (1) is modulated in accordance with the frequency modulation waveforms of the present invention, (2) has a user-programmable fixed frequency or (3) is synchronized with an external clock signal. Circuit 213 incorporates mode detector 214 that accepts the signal supplied to input pin PLLIN and determines whether the user desires spread spectrum frequency modulation, fixed frequency operation or synchronization of the internal clock signal with an external clock signal.

For example, when a user provides a signal HIGH at input pin PLLIN, mode detector 214 enables spread spectrum frequency modulation and outputs a signal LOW from detector output SYNC and a signal HIGH from detector output SSM_EN. This enables DAC 216 and disables phase detector 217. A switch disposed in circuit 218 closes and couples input pin FLTR to DAC output current $I_{DAC}$. This permits a low pass signal control filter coupled to input pin FLTR, e.g., a capacitor coupled to ground, to filter DAC output current $I_{DAC}$, and thereby protect the switching regulator from loose regulation and reduce audible noise. Circuit 218 then outputs charging current $I_{CHRG}$ having a magnitude equal to that of filtered DAC output current $I_{DAC}$ to oscillator 74, 89 or 186.

When a user provides a signal LOW at input pin PLLIN, mode detector 214 enables fixed frequency operation and outputs LOW signals from detector outputs SYNC and SSM_EN. This disables phase detector 217 and DAC 216 so that no signals are output therefrom. The signal LOW of output SSM_EN also instructs bias current generator 215 to generate a reference current $I_6$ for delivery to circuit 218. A user programs the fixed frequency of the generated clock signal by supplying one of a plurality of predetermined voltages to input pin FLTR. Circuit 218 incorporates logic that detects that voltage and either (1) shunts reference current $I_6$ directly to the oscillator or (2) generates a current proportional to reference current $I_6$ for provision to the oscillator.

When an external clock signal is provided to input pin PLLIN, circuit 213 synchronizes the internal clock signal with the external clock signal. Mode detector 214 outputs a signal HIGH from detector output SYNC and a signal LOW from detector output SSM_EN. This disables DAC 216 and enables phase detector 217, which compares the external clock signal to internal clock signal 23 and outputs signal 219 indicative of the difference therebetween. Signal 219 is compensated by a low pass filter coupled to input pin FLTR, e.g., a capacitor and resistor coupled to ground. A current steering comparator disposed within circuit 218 then compares signal 219 to a reference voltage and outputs a current to the oscillator responsive thereto.

Figure 20:
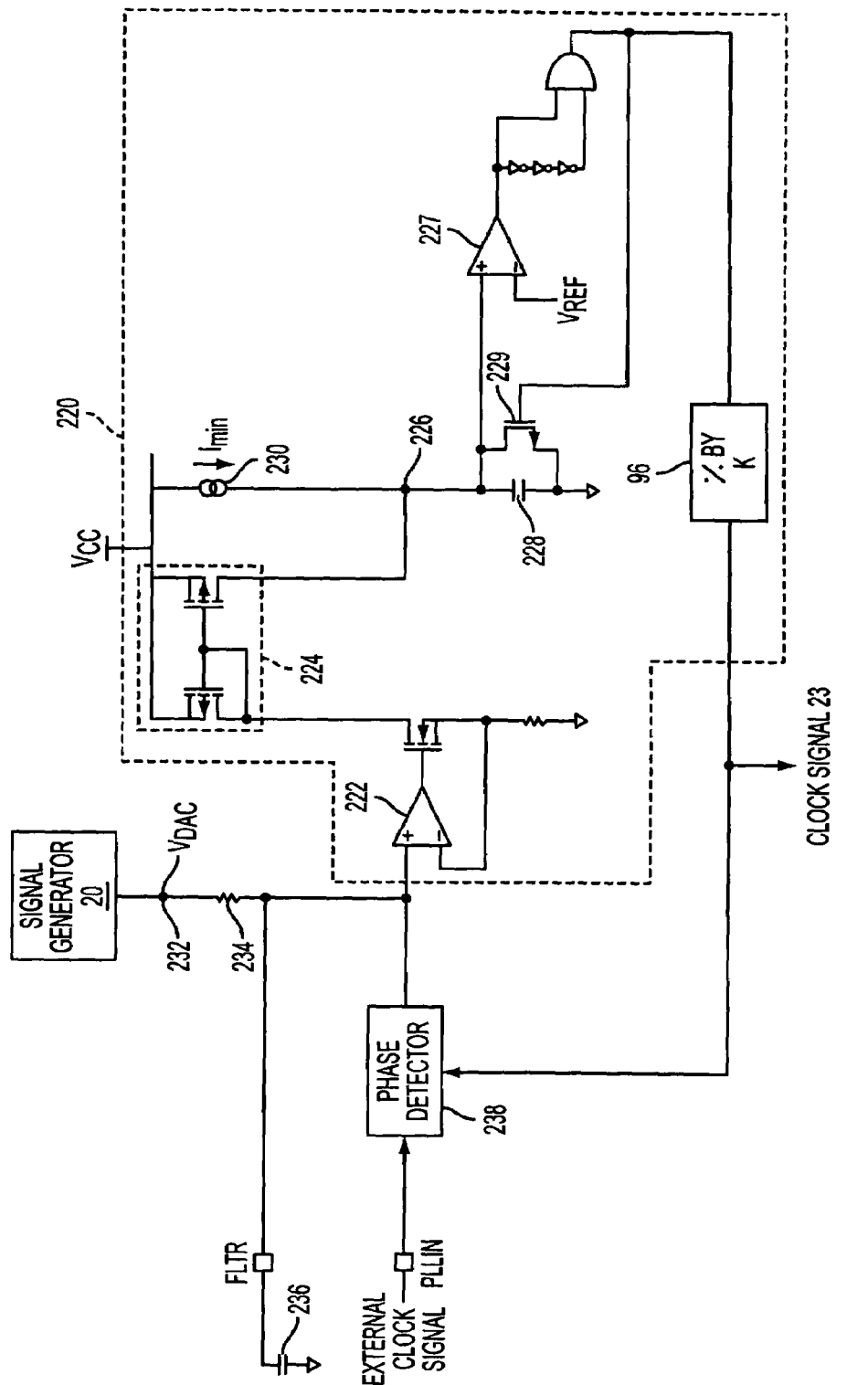
FIG. 20 is a fourth embodiment of an oscillator having a linear input-to-output transfer function.

Referring now to FIG. 20, a fourth embodiment of oscillator 22 is described, wherein the oscillator has a linear input-to-output transfer function. In contrast to the current-controlled oscillators of FIGS. 13-15 and 18, the frequency of the clock signal generated by oscillator 220 is voltage-controlled. Oscillator 220 comprises amplifier 222 having a feedback loop and current mirror 224 that supplies as much current as needed to servo the inverting input of amplifier 222 at the voltage supplied to the non-inverting input. The servo current then is mirrored by current mirror 224 to generate a proportional current to charge timing capacitor 228. To discharge timing capacitor 228, oscillator 220 comprises comparator 227 that directs switch 229 to short circuit capacitor 228 to ground when it determines that the voltage across the capacitor has reached or exceeded constant reference voltage $V_{REF}$.

The amount of current supplied to charge timing capacitor 228, and thus the frequency of clock signal 23, is dependent on the voltage supplied to the non-inverting input of amplifier 222. To modulate the frequency of clock signal 23 in accordance with the frequency modulation waveforms of the present invention, signal generator 20 provides at node 232 a varying voltage signal waveform having magnitudes over a period of time that, if sorted in increasing numerical order, form a curve that approximates the shape of the frequency modulation waveforms of the present invention. Coupled between node 232 and the non-inverting input of amplifier 222 is filter resistor 234, which, along with filter capacitor 236, protects the switching regulator against loose regulation and reduces audible noise during spread spectrum frequency modulation. As discussed above, the capacitance and resistance of capacitor 236 and resistor 234 (respectively) may be adjusted to change the range of operating frequencies over which the switching regulator is modulated. An additional resistor (not shown) may be disposed in parallel with capacitor 236 or connected between a constant voltage source and the FLTR pin to change the modulation range (as discussed above).

Circuit 220 also may comprise optional constant current source 230 to supply minimum current $I_{MIN}$ to charge timing capacitor 228 in situations when current mirror 224 generates no current. For example, if signal generator 20 is configured to generate a minimum signal magnitude that forces the voltage at the non-inverting input of amplifier 222 to zero (0), minimum current $I_{MIN}$ is used to charge timing capacitor 228. Alternatively, current source 230 also is employed during fixed frequency operation or during synchronization of clock signal 23 with an external clock signal. In the latter case, minimum current $I_{MIN}$ supplies current to charge timing capacitor 228 in addition to the current generated by current mirror 224 responsive to the signal output by phase detector 238. If employed, minimum current $I_{MIN}$ limits the minimum switching frequency, and may be used to bias the MOS transistors in circuit 220 for operation in the saturation region. One of ordinary skill in the art will recognize that any of the MOS transistors illustrated herein may be replaced with a different type of transistor, e.g., bipolar junction transistors. If BJTs are used, minimum current $I_{MIN}$ may be used to bias the bipolar junction transistors in the linear region of operation.

Figure 21:
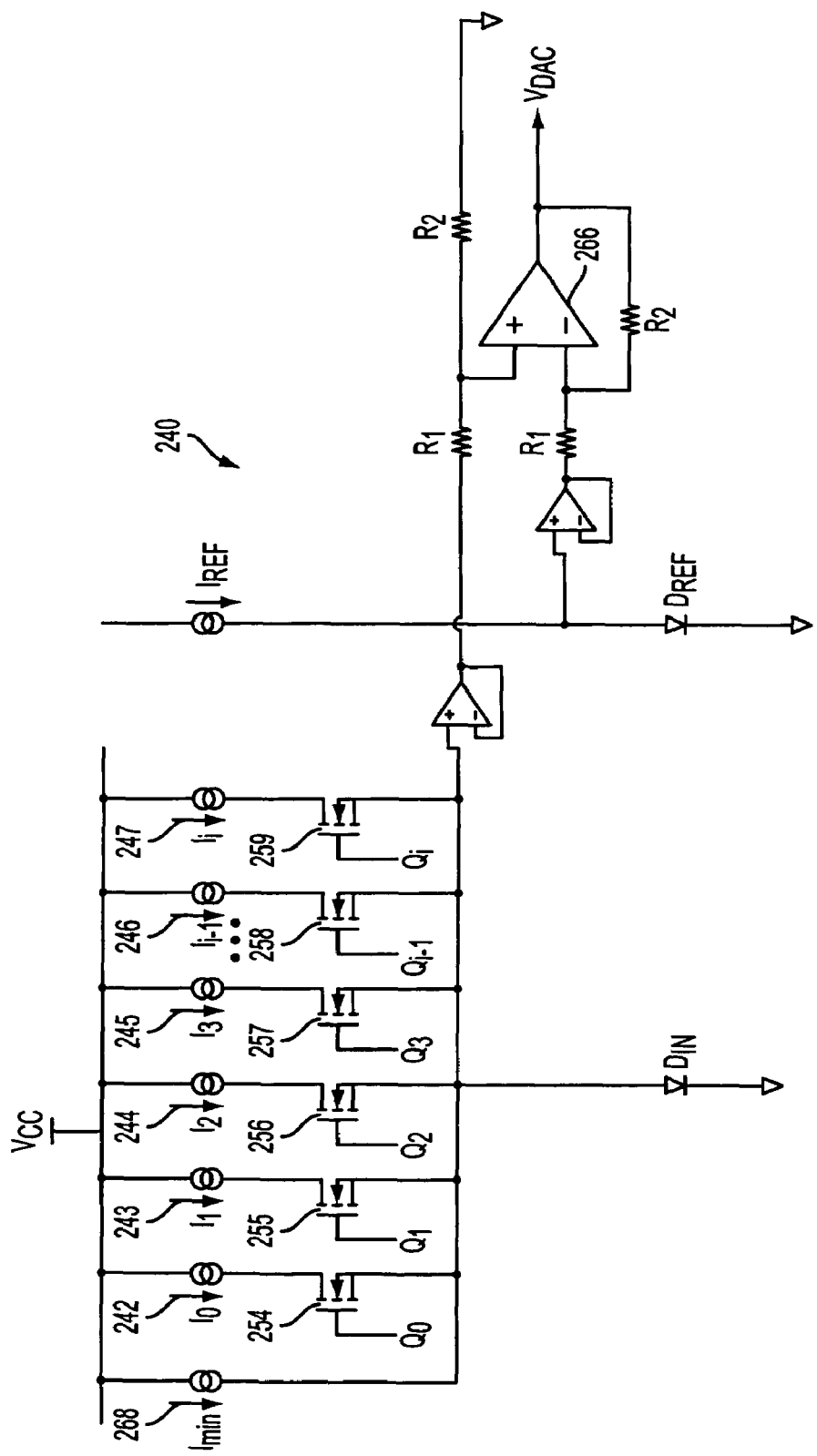
FIG. 21 is a third embodiment of a DAC that may be configured with the input-to-output transfer function of FIG. 11.

FIG. 21 illustrates a digital-to-analog converter that modulates voltage signal $V_{DAC}$ in accordance with the frequency modulation waveforms of the present invention. DAC 240 comprises current source 268 that provides constant minimum current $I_{MIN}$ to diode $D_{IN}$ when spread spectrum frequency modulation is enabled. This establishes base voltage $V_{MIN}$ across diode $D_{IN}$ as follows:

$$V_{MIN} = V_T \ln\left(\frac{I_{MIN}}{I_S}\right) \qquad \text{EQ. 19}$$

where $V_T$ is the thermal voltage of diode $D_{IN}$, and $I_S$ is the saturation current (also known as the scale current) of diode $D_{IN}$. Voltage $V_{MIN}$ is supplied to difference amplifier 266 along with a reference voltage established by constant reference current $I_{REF}$ and diode $D_{REF}$. Amplifier 266 outputs the resulting difference as DAC output voltage $V_{DAC}$, which equals the following:

$$V_{DAC,MIN} = \frac{R_2}{R_1} V_T * \ln\frac{I_{MIN}}{I_{REF}} \qquad \text{EQ. 20}$$

assuming diodes $D_{IN}$ and $D_{REF}$ have equal saturation currents. Minimum DAC output voltage $V_{DAC,MIN}$, when supplied to oscillator 220, sets the frequency of clock signal 23 at a base frequency.

To modulate the magnitude of DAC output voltage $V_{DAC}$, DAC 240 comprises a plurality of current sources 242-247 that may be coupled in parallel to base current source 268 responsive to the action of switches 254-259. Each switch 254-259 is disposed in series with its corresponding current source 242-247 and is driven by a signal output by pseudo-random generator 24. When a switch turns on and permits its corresponding current source to supply current to diode $D_{IN}$, the current provided by that current source is aggregated to minimum current $I_{MIN}$ supplied by base current source 268. This increases the voltage established across diode $D_{IN}$, thereby increasing DAC output voltage $V_{DAC}$, which in turn causes oscillator 220 to increase the frequency of clock signal 23. The magnitude of current sources 242-247 are selected to operate in concert with pseudo-random generator output signals $Q_0$-$Q_i$ to generate a linear output. All currents $I_{MIN}$ and $I_0$-$I_i$ are aggregated and supplied to diode $D_{IN}$, which establishes an input-to-output transfer function that approximates the shape of the frequency modulation waveforms of the present invention. In particular, DAC 240 generates a voltage signal waveform having magnitudes over time that, if sorted in increasing numerical order, form a curve that approximates the shape of frequency modulation waveform 14 of the present invention as expressed by EQ. 5A.

Figure 22:
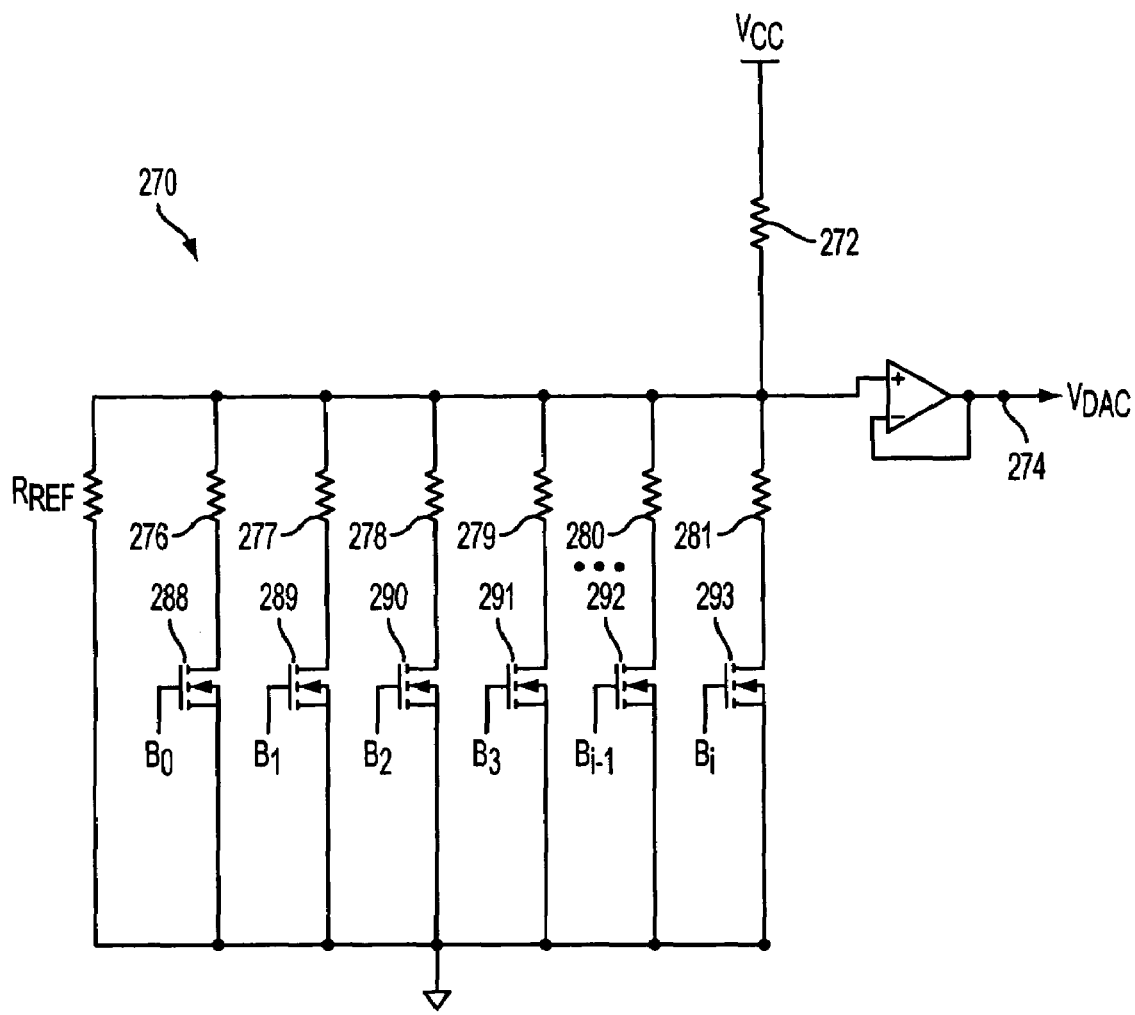
FIG. 22 is a fourth embodiment of a DAC that may be configured with the input-to-output transfer function of FIG. 11.

FIG. 22 illustrates an alternative embodiment of a digital to analog converter that outputs a voltage signal to modulate the frequency of clock signal 23 in accordance with the frequency modulation waveforms of the present invention. DAC 270 is configured as a variable resistance voltage divider having a base voltage defined by supply source $V_{CC}$ and resistors 272 and $R_{REF}$. When output to oscillator 220, the base voltage sets the frequency of clock signal 23 at a base frequency, which in this case corresponds to a maximum switching frequency.

To modulate the magnitude of DAC output voltage $V_{DAC}$, DC 270 comprises a plurality of resistors 276-281 that are coupled in parallel to reference resistor $R_{REF}$ responsive to signals output by pseudo-random generator 24. For example, pseudo-random generator signals $Q_0$-$Q_1$ preferably are supplied to a decoder, e.g., a thermometer decoder (not shown), that outputs decoder signals $B_0$-$B_1$ to switches 288-293, each of which are connected in series to a corresponding resistor 276-281. When a switch, e.g., switch 288, receives an appropriate decoder signal from the decoder, it closes, connecting its associated resistor, e.g., resistor 276, in parallel with resistor $R_{REF}$, thereby changing DAC output voltage $V_{DAC}$. The resistance of resistors 276-281 are selected to operate in concert with decoder output signals $B_0$-$B_i$ to establish an input-to-output transfer function that approximates the shape of the frequency modulation waveforms of the present invention. Accordingly, DAC 270 generates a voltage signal waveform over time having magnitudes that, if sorted in increasing numerical order, form a curve that approximates the shape of the frequency modulation waveform of the present invention.

One of ordinary skill in the art will recognize that one or more resistors 272, 276-281 and $R_{REF}$ may be replaced by other circuit elements having impedance, e.g., MOSFETs, capacitors, inductors, etc.

Figure 23:
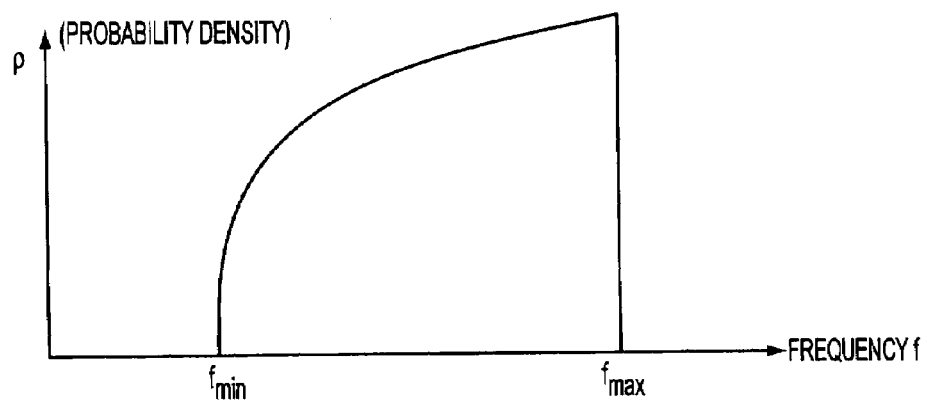
FIG. 23 depicts an illustrative probability function of a pseudo-random code generator of a second embodiment of the frequency modulation circuits of the present invention.

In a second embodiment of frequency modulation circuit 18 of the present invention, pseudo-random code generator 24 comprises a generator having a probability distribution that approximates the frequency modulation waveforms of the present invention as shown in FIG. 23. This contrasts with the uniform probability density of the pseudo-random generators employed in the first embodiment of the frequency modulation circuits of the present invention. To generate a non-linear probability distribution, pseudo-random code generator 24 may employ non-linear feedback circuit 30 or a memory look-up table. When frequency modulation circuit 18 comprises a pseudo-random generator having a non-linear probability density that approximates the shape of the frequency modulation waveforms of the present invention, DAC 26 is modified slightly to have a linear input-to-output transfer characteristic.

Figure 24:
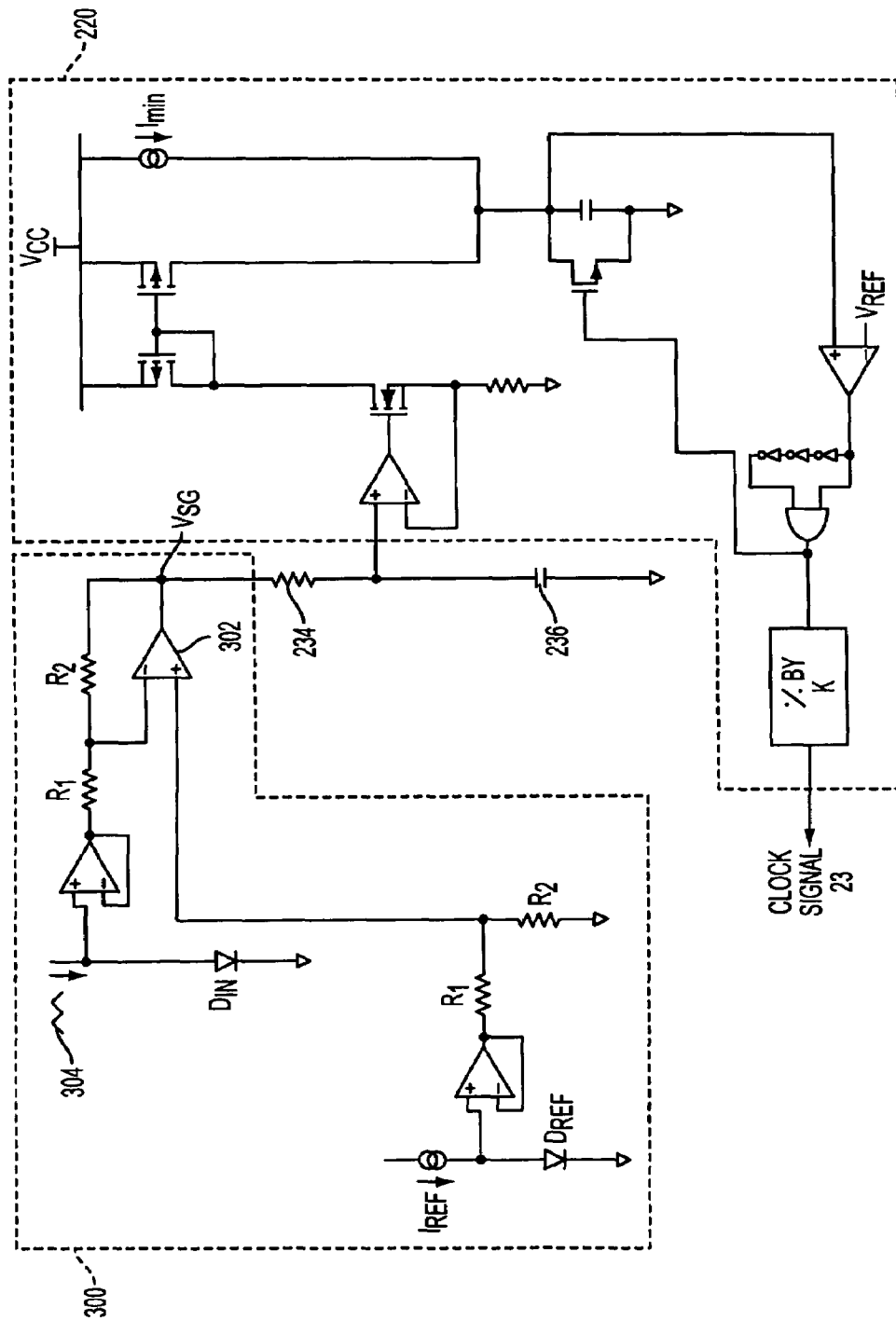
FIG. 24 is a schematic of a first embodiment of a signal generator of a third embodiment of the frequency modulation circuits of the present invention in which sequential frequency modulation is employed.

In a third embodiment of the present invention, frequency modulation circuit 18 is configured to employ sequential frequency modulation, rather than pseudo-random frequency modulation. Rather than providing oscillator 22 with a pseudo-random signal, signal generator 20 is configured to modulate the frequency of clock signal 23 directly with a signal waveform that approximates the shape of the frequency modulation waveforms of the present invention. For example, FIG. 24 illustrates signal generator 300 configured to supply oscillator 220 with a smooth continuous, sequential voltage waveform having voltage levels over time that, if sorted in increasing numerical order, form a curve that approximates the shape of the frequency modulation waveforms of the present invention. One of ordinary skill in the art will recognize that continuous waveforms may be considered as comprising a series of discrete magnitudes for a given time differential.

Figure 25A:
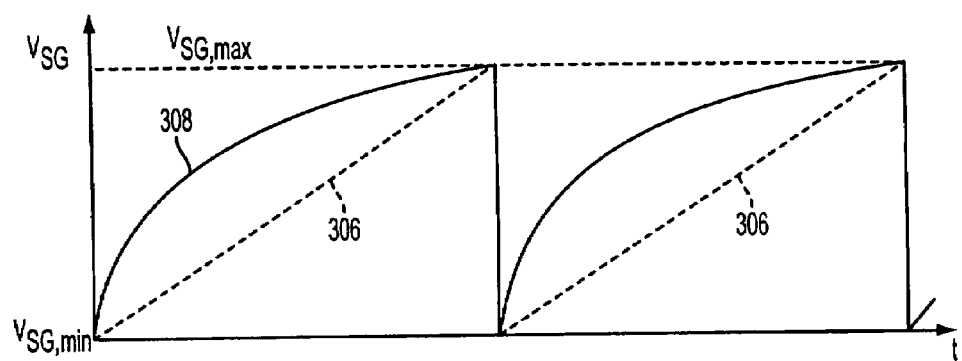
FIGS. 25A-B are illustrative graphs of output waveforms of the signal generator of FIG. 24.
Figure 25B:
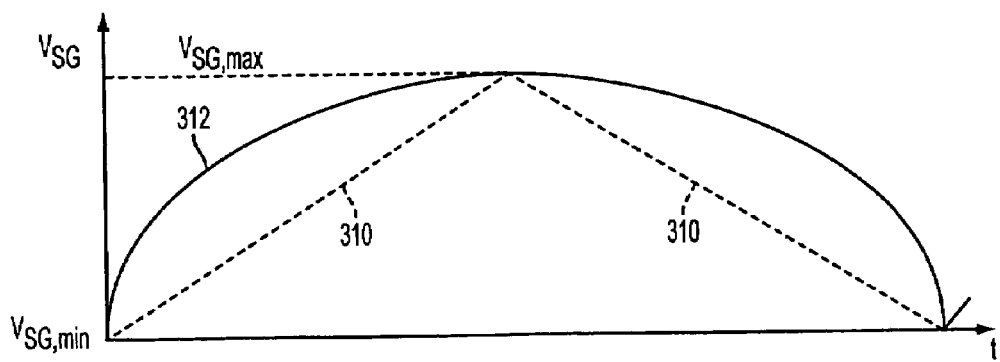

Signal generator 300 is configured similarly to DAC 240 of FIG. 21 in that it comprises diodes $D_{IN}$ and $D_{REF}$. When the difference in voltages established across diodes $D_{IN}$ and $D_{REF}$ are compared by differential amplifier 302, the resulting signal generator output voltage $V_{SG}$ is characterized by a logarithmic function similar to that expressed by EQ. 20. To modulate output voltage $V_{SG}$, and thereby modulate the frequency of clock signal 23, in accordance with the frequency modulation waveforms of the present invention, signal generator 300 accepts or generates linear input current signal 304. For example, input current waveform 304 may comprise linear curve 306 (see FIG. 25A) in which the input current increases at a slower rate than it decreases. FIG. 25A depicts an illustrative resultant generator output voltage waveform 308. Alternatively, input current waveform 304 may comprise linear curve 310 (see FIG. 25B) in which the input current waveform increases approximately at the same rate that it decreases. This generates output voltage waveform 312 from signal generator output voltage $V_{SG}$ in which the shape of the decreasing portion of output voltage waveform 312 approximates a mirror replica of the increasing portion of output voltage waveform 312. These signal generator output waveforms, when supplied to oscillator 22, modulates the frequency of clock signal 23 in accordance with the frequency modulation waveforms of the present invention. While FIG. 25A depicts a rate of decrease that appears to be nearly instantaneous, the maximum rate of decrease is limited by the capability of the circuit. Furthermore, the rates of decrease depicted in FIGS. 25A-B are not intended to limit the scope of the invention. Rather, input current waveform may decrease at any rate with respect to the rate at which it increases. Furthermore, FIGS. 25A-B depict input current waveforms 306 and 310 intercepting signal generator output voltage waveform 308 and 312 at $V_{SG,MAX}$ and $V_{SG,MIN}$ for illustrative purposes only.

Figure 26:
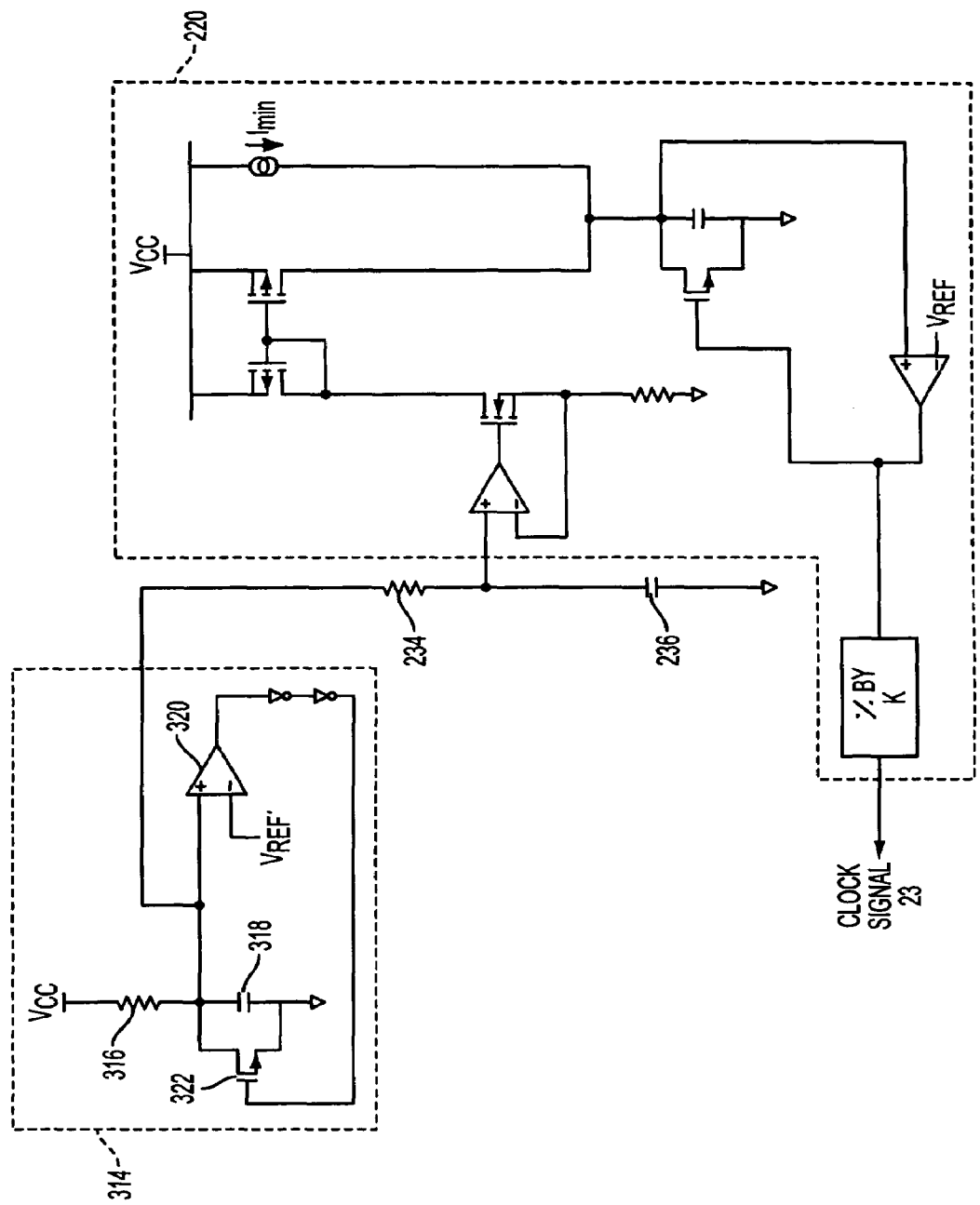
FIG. 26 is a schematic of a second embodiment of the signal generator of the third embodiment of the frequency modulation circuits of the present invention.

FIG. 26 illustrates a second embodiment of a signal generator configured to supply oscillator 220 with a continuous, sequential voltage waveform having voltage levels over time that, if sorted in increasing numerical order, form a shape that approximates the frequency modulation waveforms of the present invention. Signal generator 314 comprises an R-C circuit having resistor 316 and capacitor 318 coupled in series between supply voltage source $V_{CC}$ and ground. Supply source $V_{CC}$ charges capacitor 318 such that the voltage across capacitor 318 increases exponentially in accordance with a frequency modulation waveform that may be approximated by EQ. 5B. The resistance of resistor 316 and capacitance of capacitor 318 may be chosen to define base frequency $f_{A2}$ and constant $K_3$ of EQ. 5B. The voltage across capacitor 318 is supplied to oscillator 220 to modulate the frequency of clock signal 23 in accordance with the frequency modulation waveforms of the present invention. Capacitor 318 is discharged by a discharge circuit, e.g., comparator 320 that directs switch 322 to short circuit capacitor 318 to ground when it determines that the voltage across the capacitor has reached a threshold voltage level.

The values of filtering resistor 234 and filtering capacitor 236 may be selected to reduce the rate of change of the frequency of clock signal 23 as described above.

Figure 27:
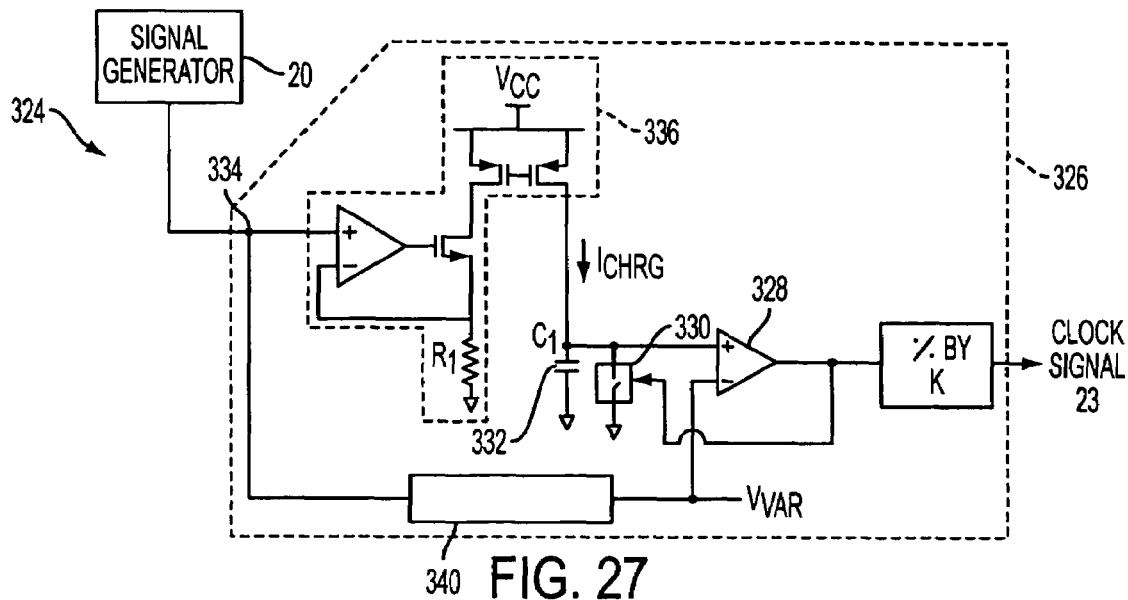
FIG. 27 is a fourth embodiment of the frequency modulation circuits of the present invention, in which the oscillator is configured to have an input-to-output transfer function that approximates the shape of the frequency modulation waveforms of the present invention.
Figure 28:
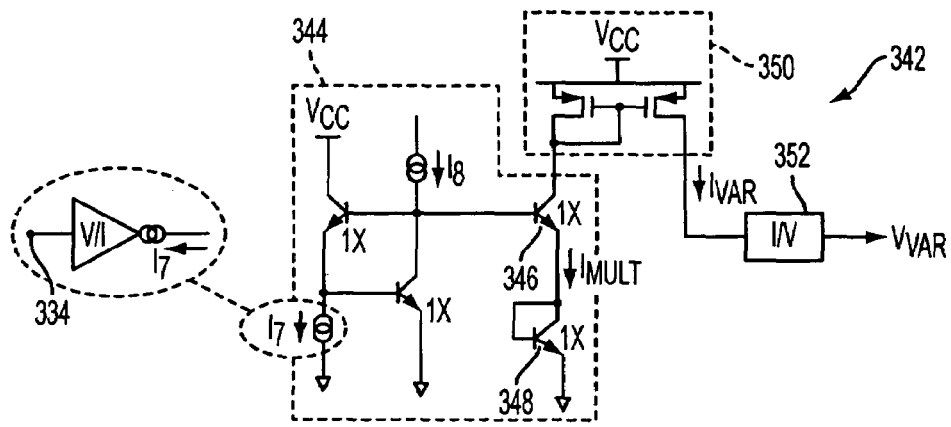
FIGS. 28 and 29 are alternative embodiments of a variable reference voltage generator of the frequency modulation circuit of FIG. 27.
Figure 29:
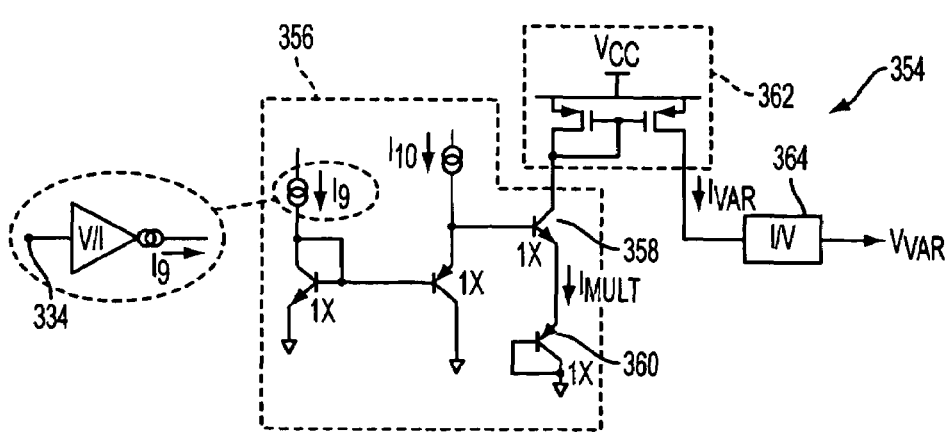
Figure 30:
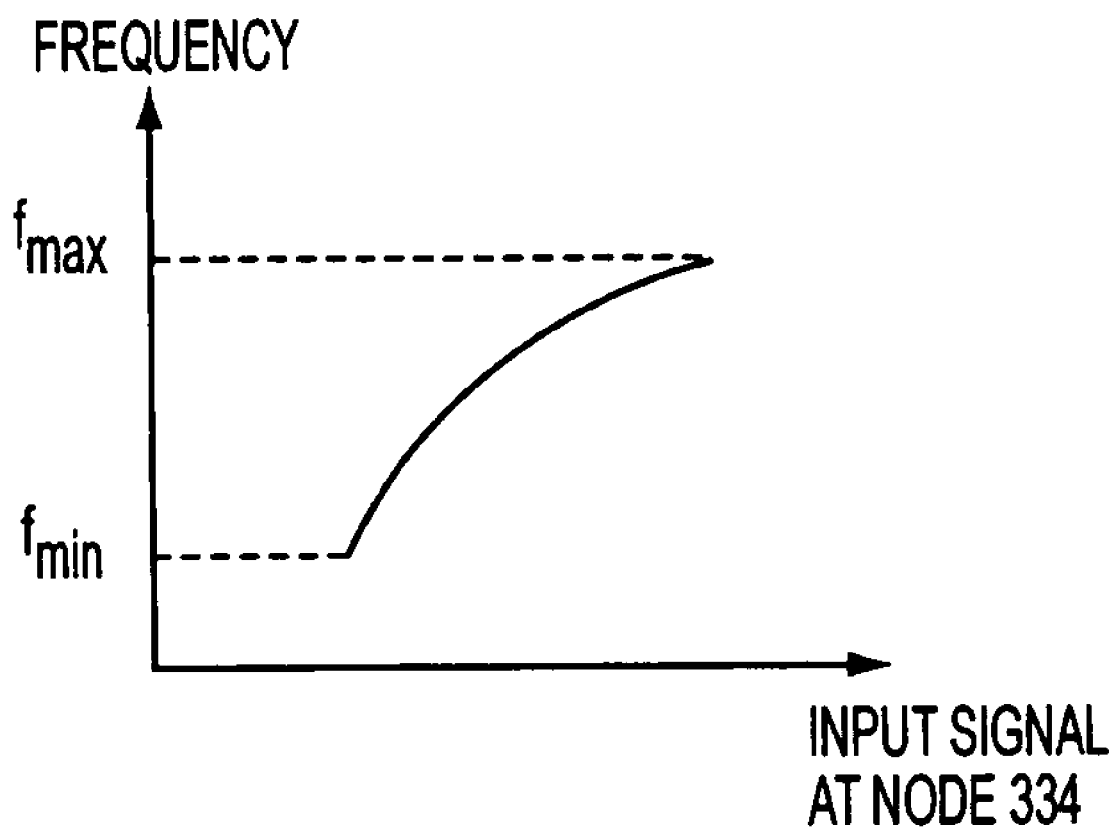
FIG. 30 provides an illustrative input-to-output transfer function for the oscillator of FIG. 27.

Referring now to FIGS. 27-29, a fourth embodiment of frequency modulation circuit 18 of the present invention is described. Frequency modulation circuit 324 comprises oscillator 326 having an input-to-output transfer function that approximates the shape of the frequency modulation waveforms of the present invention over the frequency range of interest (see FIG. 30). Oscillator 326 is configured similarly to oscillator 220 of FIG. 20 except that comparator 328 directs switch 330 to discharge timing capacitor 332 by shorting the capacitor to ground when the comparator determines that the voltage across the capacitor has reached a variable reference voltage level that varies in a manner that modulates the frequency of clock signal 23 in accordance with the frequency modulation waveforms of the present invention.

More specifically, signal generator 20 supplies oscillator 326 with a sequential or pseudo-random linear voltage waveform at input node 334. Voltage-to-current converter 336 converts each voltage magnitude of the linear voltage waveform into corresponding current that charges timing capacitor 332. This establishes a voltage across timing capacitor 332 that is compared by comparator 328 with a varying reference voltage that variable reference voltage generator 340 controls to modulate the frequency of clock signal 23 in accordance with the frequency modulation waveforms of the present invention. When the voltage across timing capacitor 332 equals or exceeds the variable reference voltage signal, comparator 328 outputs a signal HIGH that closes switch 330 and short-circuits the timing capacitor to ground. When the timing capacitor is discharged, the comparator outputs a signal LOW, permitting charging current $I_{CHRG}$ to recharge the timing capacitor. Over time, this generates a pulsed clock signal having a frequency that is modulated in accordance with the frequency modulation waveforms of the present invention.

Oscillator 326 modulates the frequency of clock signal 23 according to the following equation:

$$f_S = \frac{V_{IN}}{R_1 C_1 V_{VAR}} \qquad \text{EQ. 21}$$

where $V_{IN}$ is the linear voltage waveform supplied by signal generator 20, $R_1$ is the resistance of resistor $R_1$, $C_1$ is the capacitance of timing capacitor 332, $V_{VAR}$ is the reference voltage generated by variable reference voltage generator 340. In accordance with the principles of the present invention, variable reference voltage generator 340 varies reference voltage $V_{VAR}$ in a manner that modulates the frequency of clock signal 23 in accordance with the frequency modulation waveforms of the present invention.

Referring now to FIG. 28, a first illustrative embodiment of variable reference voltage generator 340 is described. Variable reference voltage generator 342 comprises multiplier 344 that generates current $I_{MULT}$ through bipolar transistors 346 and 348. Current $I_{MULT}$ has a magnitude that is a function of currents $I_7$ and $I_8$ as follows:

$$I_{MULT} = \sqrt{I_7 \ast I_8} = K_8 \sqrt{V_{IN}} \qquad \text{EQ. 22}$$

where $I_8$ is a constant reference current. $I_7$ is the current equivalent of input voltage $V_{IN}$ supplied by signal generator 20 and may be obtained by using a voltage to current converter. Alternatively, $I_7$ may be a constant reference current, while $I_8$ corresponds to the input voltage supplied by signal generator 20. $K_8$ is a constant that is a function of the reference current $I_8$ and the electronic components of the voltage to current converter that is used to convert input voltage $V_{IN}$ to current $I_7$.

Current mirror 350 then mirrors current $I_{MULT}$ and generates variable reference current $I_{VAR}$ that is proportional to multiplier current $I_{MULT}$. Current-to-voltage converter 352 then converts variable reference current $I_{VAR}$ into variable reference voltage $V_{VAR}$, which resembles multiplier current $I_{MULT}$ in that it also is approximated by a voltage waveform that is proportional to the square root of input voltage $V_{IN}$. Variable reference voltage $V_{VAR}$ then is supplied to comparator 328. Because variable reference voltage $V_{VAR}$ in the embodiment of FIG. 28 is proportional to the square root of input voltage $V_{IN}$, EQ. 21 describes a frequency modulation waveform over time having voltage levels that, if sorted in increasing numerical order, form a shape that approximates the frequency modulation waveform expressed by EQ. 6. As used herein, proportional signals include the condition in which the signals have equivalent magnitudes.

Referring now to FIG. 29, a second illustrative embodiment of variable reference voltage generator 340 is described. Variable reference voltage generator 354 comprises a second embodiment of multiplier 356 that generates current $I_{MULT}$ through bipolar transistors 358 and 360. Multiplier current $I_{MULT}$ has a magnitude that is a function of currents $I_9$ and $I_{10}$ as follows:

$$I_{MULT} = \sqrt{I_9 * I_{10}} = K_{10}\sqrt{V_{IN}} \qquad \text{EQ. 23}$$

where $I_{10}$ is a constant reference current. $I_9$ is the current equivalent of input voltage $V_{IN}$ supplied by signal generator 20 and may be obtained by using a voltage to current converter. Alternatively, $I_9$ may be a constant reference current, while $I_{10}$ corresponds to the input voltage supplied by signal generator 20. $K_{10}$ is a constant that is a function of the reference current $I_{10}$ and the electronic components of the voltage to current converter that is used to convert input voltage $V_{IN}$ to current $I_9$.

Current mirror 362 then mirrors current $I_{MULT}$ and generates variable reference current $I_{VAR}$ that is proportional to multiplier current $I_{MULT}$. Current-to-voltage converter 364 then converts variable reference current $I_{VAR}$ into variable reference voltage $V_{VAR}$, which resembles multiplier current $I_{MULT}$ in that it also is approximated by a voltage waveform that is proportional to the square root of input voltage $V_{IN}$. Variable reference voltage $V_{VAR}$ then is supplied to comparator 328. Because variable reference voltage $V_{VAR}$ in the embodiment of FIG. 29 is proportional to the square root of input voltage $V_{IN}$, EQ. 21 describes a frequency modulation waveform over time having voltage levels that, if sorted in increasing numerical order, form a shape that approximates the frequency modulation waveform expressed by EQ. 6.

Although variable reference voltage generators 342 and 354 respectively depicted in FIGS. 28-29 generate a variable reference voltage $V_{VAR}$ that is approximated by a square root function, one of ordinary skill in the art will recognize that alternative embodiments of variable reference voltage generators also may be employed. More specifically, variable reference voltage generator 340 may be configured to generate any variable reference voltage $V_{VAR}$ that modulates the frequency of clock signal 23 in accordance with the frequency modulation waveforms of the present invention. One of ordinary skill in the art also will recognize that variable reference voltage generator 340 may comprise any of the circuits discussed herein that may be configured to generate a waveform that, when supplied to an oscillator, modulates the frequency of clock 23 in accordance with the frequency modulation waveforms of the present invention.

One of ordinary skill in the art also will recognize that, rather than using variable reference voltage generators 342 and 354 to vary the reference voltage of comparator 328, variable reference voltage generators 342 and 354 also may be employed in sequential frequency modulation to charge the timing capacitors incorporated in any of the oscillators described above if the reference voltages of the comparators used therein are fixed. More specifically, for current-controlled oscillators, variable reference current $I_{VAR}$ from variable reference voltage generators 342 and 354 may directly charge the timing capacitor. For voltage-controlled oscillators, variable reference voltage $V_{VAR}$ from variable reference voltage generators 342 and 354 may be supplied to the oscillators instead.

In addition to reducing the differential-mode and radiated noise at the output of a switching regulator, the frequency modulation waveforms and circuits of the present invention described herein also may be configured to reduce the differential-mode and radiated noise at the input of a switching regulator from the level generated in fixed frequency operation or when modulated in accordance with a linear modulation waveform. Similar to the noise at the regulator output, the differential-mode noise at the input of a switching regulator also is a function of the regulator switching frequency. When the regulator frequency is modulated with a linear frequency modulation waveform, the differential-mode noise spectrum at the regulator input also exhibits "horns" at the extremes of the switching frequencies and a tilted spectral ceiling (although to a lesser degree than the tilt exhibited by the differential-mode noise spectrum at the regulator output). For the same application and loading condition, the peak noise amplitude waveform at the regulator input comprises a non-linear curve that is less non-linear (or less curved) than the peak noise amplitude waveform at the regulator output. Although the peak noise amplitude waveform at the input of a switching regulator is less non-linear than that at the regulator output, it still is similar in shape to that illustrated in FIG. 4.

Accordingly, to reduce the differential-mode noise at the regulator input, the switching frequency also may be modulated in accordance with a frequency modulation waveform of the present invention (e.g., a frequency modulation waveform that is coordinated to the peak noise amplitude waveform at the regulator input and may be approximated by one or more of EQS. 5-15). The difference in non-linearity of the peak noise amplitude waveform at the regulator input. (as opposed to that at the regulator output) is reflected in the different constants of the approximation functions, e.g., constants $K_i$ in EQS. 5-7. To modulate the frequency of the switching regulator in accordance with a frequency modulation waveform that is coordinated to the peak noise amplitude waveform at the input of a switching regulator, the frequency modulation circuits of the present invention may be used. The peak noise amplitude waveform at the input of a switching regulator may be measured with a spectrum analyzer or one of ordinary skill in the art can derive the waveform for a particular loading condition and application in accordance with the principles of the present invention.

Although illustrative embodiments of the present invention are described above, one skilled in the art will recognize that various changes and modifications may be made with minor design modifications without departing from the invention. For example, while pseudo-random noise is generated digitally by self-feeding shift register 28, one of ordinary skill in the art will recognize that pseudo-random or random noise also may be generated by an analog method, for example, by amplifying avalanche noise.

Furthermore, while the frequency modulation circuits described above employ a closed loop synchronization method, e.g., phase locked loop, to synchronize clock signal 23 to an external clock signal when pseudo-random frequency modulation and slope compensation is employed in constant-frequency or spread spectrum current mode switching regulators, open loop synchronization methods also may be used, e.g., edge triggered synchronization (also known as injection lock synchronization) in which each rising or falling edge of the external clock signal triggers the switching action of the converter. In constant or spread spectrum current mode switching regulators, additional measures may be required to maintain the stability of the switching regulator for slope compensation if edge triggered synchronization is employed with an external frequency modulation circuit (i.e., when frequency modulation circuit 18 of the present invention is not integral to the switching regulator or IC). When frequency modulation circuit 18 of the present invention is integral to the switching regulator or IC, the switching regulator is more likely to maintain stability without the need for additional measures even when edge triggered synchronization is employed. Voltage mode, constant-on-time current mode, or constant-off-time current mode switching regulators also may employ either phase locked loop or edge triggered synchronization.

One of ordinary skill in the art also will recognize that any of the signal generators described herein that output voltage also may be used with any current-controlled oscillator by interposing a voltage-to-current converter therebetween. Likewise, any voltage-controlled oscillators also may be used with any signal generators that output current by interposing a current-to-voltage converter therebetween.

Furthermore, frequency modulation circuit 18 of the present invention may comprise signal generator 20 that is configured to output a non-linear output signal to an oscillator having a non-linear input-to-output transfer function. Together the non-linear signal generator and non-linear oscillator may be configured to modulate the switching frequency of a voltage regulator in accordance with the frequency modulation waveforms of the present invention.

In addition, while the sequential frequency modulation circuits described herein modulate the operating frequency of the switching regulator with a smooth continuous signal, one of ordinary skill in the art will recognize that sequential frequency modulation of the present invention also may include modulating the frequency of the regulator with a step-wise continuous sequential signal that causes the switching frequency of the regulator to "hop" from sequentially increasing and decreasing values with time in a step-wise manner along a curve that approximates the frequency modulation waveforms of the present invention. For example, signal generator 20 may comprise a non-linear DAC configured to output a step-wise continuous sequential signal having a shape similar to sorted signal 21 illustrated in FIG. 11.

In addition, while the peak noise amplitude waveform illustrated by FIG. 4 and expressed by EQ. 4 were generated in accordance with a spectrum analyzer, peak noise amplitude waveforms also may be measured or derived using other measurement and analytical methods, e.g., fast Fourier transformation.

The circuits of the present invention also may comprise additional components for, e.g., filtering, reducing chatter, providing stability, and electrostatic discharge protection. Furthermore, the timing capacitors incorporated in the oscillators described herein may be replaced with other energy storage components, e.g., inductors. One of ordinary skill in the art also will recognize that alternative oscillator topologies also may be employed, such as, for example, L-C resonant oscillators.

Additionally, although the methods and circuits of the present invention are discussed with respect to switching voltage regulators, the present invention also may be applied to any switching power converters, e.g., switching current regulators such as constant current battery chargers.

Furthermore, although the frequency modulation waveforms of the present invention are described as being coordinated to the differential-mode peak noise amplitude waveform to target reduction of differential-mode noise, one of ordinary skill in the art will recognize that the frequency modulation waveforms of the present invention also may be coordinated to the peak noise amplitude waveform of the radiated noise or other noise modality at the input or output of a switching regulator to target reduction of that noise.

One of ordinary skill in the art also will recognize that, although specific circuits are described herein, the frequency modulation methods of the present invention may be employed using numerous signal generator and oscillator circuits well known in the art and otherwise. For example, the circuits described in the Hardin patent and in U.S. Pat. No. 5,929,620 to Dobkin et al. ("the Dobkin patent") may be configured to modulate the frequencies of the clock signal in accordance with the frequency modulation waveforms of the present invention.

Furthermore, while the figures described herein illustratively depict clock signal 23 as being a rectangular or square signal having various duty cycles, clock signal 23 also may comprise a ramped waveform as described with respect to FIG. 13A.

It is intended in the appended claims to cover all such changes and modifications that fall within the true spirit and scope of the invention.

What is claimed is:

1. A circuit for reducing peak spectral noise of a switching regulator, wherein a noise spectrum having a spectral ceiling may be generated, the circuit comprising:
    a signal generator that generates a varying signal, the signal generator configured to vary the varying signal to form a signal waveform over time; and
    an oscillator that generates a clock signal using the varying signal to modulate a frequency of the clock signal in accordance with a frequency modulation waveform,
    wherein the frequency modulation waveform is a function of time and has a shape that is coordinated to a peak noise amplitude waveform.

2. The circuit of claim 1, wherein the frequency modulation waveform has a second derivative with respect to time that is negative.

3. The circuit of claim 2, wherein the frequency modulation waveform has a first derivative with respect to time that is positive.

4. The circuit of claim 1, wherein the frequency modulation waveform is approximated by a logarithmic function.

5. The circuit of claim 1, wherein the frequency modulation waveform is approximated by a square root function.

6. The circuit of claim 1, wherein the frequency modulation waveform is approximated by an inversion function.

7. The circuit of claim 1, wherein the frequency modulation waveform is approximated by an exponential function.

8. The circuit of claim 1, wherein the frequency modulation waveform has a non-linear portion and a linear portion.

9. The circuit of claim 8, wherein the non-linear portion is approximated by one of the following functions: a logarithmic function, an exponential function, a square root function, or an inversion function.

10. The circuit of claim 8, wherein the non-linear portion has a first derivative with respect to time that is positive and a second derivative with respect to time that is negative.

11. The circuit of claim of 1, wherein the frequency modulation waveform has a shape that substantially flattens the spectral ceiling.

12. The circuit of claim 1, wherein the signal waveform comprises pseudo-random signals.

13. The circuit of claim 12, wherein the signal generator comprises a pseudo-random code generator and a digital-to-analog converter.

14. The circuit of claim 13, wherein the pseudo-random code generator has a uniform probability density and the digital-to-analog converter has an input-to-output transfer function that has a shape that approximates the shape of the frequency modulation waveform.

15. The circuit of claim 13, wherein the pseudo-random code generator has a probability density having a shape that approximates the shape of the frequency modulation waveform.

16. The circuit of claim 1, wherein the signal waveform comprises sequential signals.

17. The circuit of claim 1, wherein the signal waveform comprises magnitudes that, if sorted in increasing numerical order, approximates the shape of the frequency modulation waveform.

18. The circuit of claim 1, wherein the oscillator has an input-to-output transfer function that approximates the shape of the frequency modulation waveform.

19. The circuit of claim 18, wherein the signal waveform comprises magnitudes that, if sorted in increasing numerical order, approximates a straight line.

20. The circuit of claim 1, wherein the oscillator is voltage-controlled.

21. The circuit of claim 1, wherein the oscillator is current-controlled.

22. The circuit of claim 1, further comprising a fixed frequency circuit configured to supply approximately a constant signal,
wherein at least part of the signal generator is configured to be disabled responsive to user input so that the oscillator generates the clock signal using the constant signal to fix the frequency of the clock signal at approximately a constant value.

23. The circuit of claim 1, further comprising a synchronization circuit configured to generate a synchronization signal responsive to an external clock signal,
wherein at least part of the signal generator is configured to be disabled responsive to user input so that the oscillator generates the clock signal using the synchronization signal to synchronize the frequency of the clock signal with that of the external clock signal.

24. A method for reducing peak spectral noise of a switching regulator, wherein a noise spectrum having a spectral ceiling may be generated, the method comprising:
generating a clock signal having a frequency; and
modulating the frequency of the clock signal in accordance with a frequency modulation waveform in a spread spectrum mode,
wherein the frequency modulation waveform is a function of time and has a shape coordinated to a peak noise amplitude waveform.

25. The method of claim 24, wherein modulating the frequency of the clock signal comprises modulating the frequency of the clock signal with a frequency modulation waveform having a second derivative with respect to time that is negative.

26. The method of claim 25, wherein modulating the frequency of the clock signal comprises modulating the frequency of the clock signal with a frequency modulation waveform having a first derivative with respect to time that is positive.

27. The method of claim 24, wherein modulating the frequency of the clock signal comprises modulating the frequency of the clock signal with a frequency modulation waveform approximated by a logarithmic function.

28. The method of claim 24, wherein modulating the frequency of the clock signal comprises modulating the frequency of the clock signal with a frequency modulation waveform approximated by a square root function.

29. The method of claim 24, wherein modulating the frequency of the clock signal comprises modulating the frequency of the clock signal with a frequency modulation waveform approximated by an inversion function.

30. The method of claim 24, wherein modulating the frequency of the clock signal comprises modulating the frequency of the clock signal with a frequency modulation waveform approximated by an exponential function.

31. The method of claim 24, wherein modulating the frequency of the clock signal comprises modulating the frequency of the clock signal with a frequency modulation waveform having a non-linear portion and a linear portion.

32. The method of claim 31, wherein modulating the frequency of the clock signal further comprises modulating the frequency of the clock signal with a frequency modulation waveform having a non-linear portion approximated by one of the following functions: a logarithmic function, an exponential function, a square root function, or an inversion function.

33. The method of claim 31, wherein modulating the frequency of the clock signal further comprises modulating the frequency of the clock signal with a frequency modulation waveform having a non-linear portion, in which the first derivative with respect to time is positive and the second derivative with respect to time is negative.

34. The method of claim 24, wherein modulating the frequency of the clock signal comprises modulating the frequency of the clock signal with a frequency modulation waveform that substantially flattens the spectral ceiling.

35. The method of claim 24, wherein modulating the frequency of the clock signal comprises using pseudo-random frequency modulation.

36. The method of claim 24, wherein modulating the frequency of the clock signal comprises using sequential frequency modulation.

37. The method of claim 24, further comprising:
disabling the spread spectrum mode; and
maintaining the frequency of the clock signal at a fixed frequency in a fixed frequency mode.

38. The method of claim 24, further comprising:
disabling the spread spectrum mode; and
synchronizing the frequency of the clock signal with that of an external clock signal.

39. The method of claim 38, where synchronizing the frequency of the clock signal with that of an external clock signal comprises synchronizing the frequency of the clock signal with that of an external clock signal using phase locked loop synchronization.

* * * * *